United States Patent
Wood, Jr.

(10) Patent No.: US 7,050,997 B1
(45) Date of Patent: May 23, 2006

(54) PERSONAL FINANCIAL MANAGEMENT SYSTEM, METHOD AND PROGRAM USING A GRAPHICAL OBJECT-ORIENTED PROGRAMMING METHODOLOGY

(76) Inventor: John F. Wood, Jr., 6000 Shepherd Mountain Cove #105, Austin, TX (US) 78730

( * ) Notice: Subject to any disclaimer, the term of this patent is extended or adjusted under 35 U.S.C. 154(b) by 0 days.

(21) Appl. No.: 09/502,986

(22) Filed: Feb. 11, 2000

(51) Int. Cl.
*G06F 17/60* (2006.01)

(52) U.S. Cl. .................................................. 705/36
(58) Field of Classification Search ................ 705/36, 705/37, 38
See application file for complete search history.

(56) References Cited

U.S. PATENT DOCUMENTS

| | | | |
|---|---|---|---|
| 5,231,571 A * | 7/1993 | D'Agostino | 364/408 |
| 5,590,037 A | 12/1996 | Ryan et al. | |
| 5,630,073 A | 5/1997 | Nolan | |
| 5,644,727 A | 7/1997 | Atkins | |
| 5,689,651 A * | 11/1997 | Lozman | 395/237 |
| 5,819,263 A | 10/1998 | Bromley et al. | |
| 5,835,603 A * | 11/1998 | Coutts et al. | 380/49 |
| 5,852,811 A | 12/1998 | Atkins | |
| 5,864,828 A | 1/1999 | Atkins | |
| 5,875,437 A | 2/1999 | Atkins | |
| 5,917,931 A * | 6/1999 | Kunkler | 386/137 |
| 5,918,217 A * | 6/1999 | Maggioncalda et al. | 705/36 |
| 5,978,778 A * | 11/1999 | O'Shaughnessy | 705/36 |
| 5,987,434 A * | 11/1999 | Libman | 705/36 |
| 6,014,643 A * | 1/2000 | Minton | 705/37 |
| 6,021,397 A * | 2/2000 | Jones et al. | 705/36 |
| 6,052,673 A * | 4/2000 | Leon et al. | 705/38 |
| 6,134,535 A * | 10/2000 | Beltzberg et al. | 705/37 |
| 6,195,647 B1 * | 2/2001 | Martyn et al. | 705/37 |
| 6,305,603 B1 * | 10/2001 | Grunbok | 235/379 |
| 6,418,420 B1 * | 7/2002 | DiGiorgio | 705/40 |

FOREIGN PATENT DOCUMENTS

JP    EP 1 017 004 A1 *  5/2000

OTHER PUBLICATIONS

Woodell D. Personal Financial Planning: Three Aspects, PC Magazine v4, n8,Apr. 16, 1985, p 263-265.*

* cited by examiner

*Primary Examiner*—Hani Kazimi
*Assistant Examiner*—Charles R. Kyle
(74) *Attorney, Agent, or Firm*—Taylor Russell & Russell, P.C.

(57) ABSTRACT

A personal financial management system, method and program that models past current and projected financial transaction data. Each object represents a single financial entity such as accounts, loans, assets or expenses, or a financial activity such as account transfers, deposits or withdrawals. A graphical user interface enables the user to create objects and place the objects on a graphical time line simulating financial activity from all selected objects over a selected time span. The graphical user interface also allows manipulation of the graphical objects and enables future projection of planned financial transactions. The planned financial activity is tightly bound to past and current spending and budgeting, enabling the user to match current activities to planned activities, and to identify and correct discrepancies and shortfalls in projected activities. A to-do list provides the user with reminders of planned actions to be conducted. Customized objects may also be created by the user to satisfy special financial requirements.

42 Claims, 28 Drawing Sheets

| FILE | EDIT | VIEW | INSERT | SIMULATE |

CURRENT ACTIVITY

- REGISTER
- ACCOUNTS
- CATEGORIES
- BUDGET ANALYSIS
- PLANNING ANALYSIS
- TO-DO LIST

| MY CHECKING | MY SAVINGS | MY MUTUAL |

| DATE: | DESCRIPTION: | CATEGORY: | AMOUNT: | CURR. BUDGET STATUS: |
|---|---|---|---|---|
| 5/1/99 | BIG SAVINGS | GROCERIES | $20.82 | ON BUDGET |
| 5/2/99 | SUPER GAS | AUTO | $12.43 | UNDER BY $214, .2%, 1 WK |
| 5/3/99 | FARLEYS | CLOTHING | $115.22 | UNDER BY $100, .1%, 2WKS |
| 5/5/99 | CITY POWER | ELECTRIC | $29.43 | ON BUDGET |
| 5/7/99 | TOYS&MORE | RECREATION | $54.62 | UNDER BY $19, .1%, 3DAYS |
| 5/9/99 | A+ COMPUTERS | COMPUTER | $82.20 | ON BUDGET |

CURRENT BUDGET INFORMATION FOR CATEGORY: *CLOTHING*

YOU ARE $100.00 *UNDER* THE PLANNED BUDGET FOR THIS CATEGORY. YOUR MONTHLY BUDGET FOR THIS CATEGORY IS $200, SO YOU ARE 2 WEEKS AND .1% BEHIND YOUR BUDGET FOR DATE RANGE 11/98 TO 05/99.

SELECT THE 'BUDGET ANALYSIS' TAB NOW IF YOU WISH TO ALTER THE BUDGET FOR THIS CATEGORY.

Transaction Class

```
class CTrans : public CtimeValue   // A pure-virtual/abstract
                                   //    base class!
{
public:
   CTrans(
      const char *name,   // Transaction's reference-name
      ... );              // More input parameters (not shown)
   virtual ~CTrans();

virtual CDate updateWithDate( CDate date_curr ) = 0;
               //PURE VIRTUAL!...Must inherit this class!

virtual CDate resetToFirstDate();
               // Inherited from Time/Value virtual void updateDateRange(
      CDate date_start, CDate date_stop );
               // Inherited from Time/Value protected:
   CScheduler  m_schUpdate;   // Schedules next update date
   CScheduler  m_schAdjust;   // Schedules next adjust date
   priority_t  m_priority;    // Priority (0=lowest)

}; // END of 'CTrans' class
```

FIG. 43

Account-to-Account Transfer Transaction Class

```
class CTrans_acctToAcct : public CTrans
{
public:
    CTrans_acctToAcct(
        const char *name,  // Transaction's reference-name
        ... );             // More input parameters (not shown)
    virtual ~CTrans_acctToAcct();

virtual CDate updateWithDate( CDate date_curr );

virtual CDate resetToFirstDate();
    virtual void updateDateRange(
        CDate date_start, CDate date_stop );

protected:
    CAccount   *m_acctFrom;  // Xfer 'From' this accnt
    CAccount   *m_acctTo;    // Xfer 'To' this accnt
    value_t m_moneyToXfer;   // Money to transfer at
                             //   each update schedule
    value_t m_adjustPct;     // % to adjust xfer amount }; // END of 'CTrans_acctToAcct' class
```

CASH CLASS

| AMOUNT VALUE |
| --- |
| CURRENCY TYPE (DOLLARS, POUNDS, ETC.) |
| *CREATE()* |
| *ADDTOCASH( ADD_VALUE )* |
| VALUE *GETFROMCASH()* |
| VALUE *CURRENTAMOUNT()* |

Account-to-Account Transfer
Transaction Class Method Example

```
CDate CTrans_accntToAccnt::updateWithDate( CDate
date_curr ) {
   Cdate date_test =
      SYSINTF.getCurrentDate(); // Not used, just for demo
   if ( date_test == date_curr )
      SYSINTF.print( "Just a test...dates will be equal!" );
   // If simulated current date does NOT match our expected
   //    current date, leave (an invalid condition)
   if ( date_curr != m_schUpdate.getNextDate() ) {
      SYSINTF.throwError( ERR_UNEXPECTED_DATE );
      return(date_curr);// Ends simulation for this transaction!
   }

// If current simulation date matches or exceeds
   //    our next adjustment date, adjust parameters
   if ( date_curr >= m_schAdjust.getNextDate() ) {
      m_moneyToXfer *= 1.0 + m_adjustPct / 100.0;
      m_schAdjust.computeNextDate(); }  // Set the next
            // adjustment date // CREATE 'cash' data type (simulated cash amount = 0)
   CCash cash_xfer;
   // WITHDRAW cash FROM account (simulate cash > 0)
   m_acctFrom->withdraw( m_moneyToXfer, cash_xfer );
   // DEPOSIT cash TO account (simulated cash = 0)
   m_acctTo->deposit( cash_xfer );

// LOG this transfer amount to the Time/Value (base) class
   addNew( date_curr, m_moneyToXfer );
   // Return the date that we wish the Cash-Flow Simulator to
   //    call us with again
   return( m_schUpdate.computeNextDate() );
   // NOTE: Return from this method will cause 'cash_xfer'
   //    to be destroyed, calling 'cash' class' destructor
   //    method.  A NON-ZERO simulated cash amount in
   //    'cash_xfer' would cause a system warning!
} // END of 'CTrans_accntToAccnt::updatePerDate()'
```

PERSONAL FINANCIAL MANAGEMENT SYSTEM, METHOD AND PROGRAM USING A GRAPHICAL OBJECT-ORIENTED PROGRAMMING METHODOLOGY

This invention relates generally to computer-implemented personal financial systems and methods. More particularly, the invention is a computer-implemented graphical personal financial budgeting and planning system that models current and planned financial information as graphical objects.

BACKGROUND

Many personal financial management programs distinctly divide current financial activity, such as bill paying, account reconciliation and budgeting, from long-term financial planning, such as saving for a home or investing for retirement. Typically, the current financial activity is modeled using text-based account screens that mimic checkbook registers. Long-term planning is usually a less accurate process, loosely correlated to current financial activity. Such long-term planning consists of either broadly estimating expenses into the future such as assuming needing a certain percentage of current income and expenses at retirement, or estimating income from select assets or investments and then computing payment schedules or compound interest accrued over the years until retirement.

Most personal financial management tools do not allow for concurrently planning for multiple events and activities. They do not allow current financial activities and planned activities to be closely coupled (such as buying a new car every seven years, planning a yearly summer trip, having three children, buying a house in five years, buying a second home, etc.). Because they do not allow for multiple events, they do not realistically budget for the future.

Planning for multiple events for current and planned activities requires extending the model of current activity into the realm of long-term planning. Unfortunately, the text-based methods for keeping track of current finances becomes difficult to use for projected future activities. Each financial event (such as purchasing a home) may involve simulating many separate transactions over many years (interest payments, mortgage payments, tax deductions, etc.). As more financial events are added to the plan, the text-based model becomes more complex and difficult to manage and use. Use of graphical object-oriented methodology provides a simple, easy to use implementation for gaining wide acceptance of this planning and budgeting tool. Graphical representations provide for easy distinction between many simultaneous and interrelated financial activities spread over long periods of time.

SUMMARY

The present invention is directed to a method and system that satisfies these needs and overcomes the disadvantages of the prior art. The present invention is a computer-implemented graphical personal financial budgeting and planning system that models current and planned financial information as graphical objects. The program is preferably executed on a user's personal computer or other electronic device. Using object-oriented principles, the user can construct custom objects along with customized mathematical and logical equations. Each object models a single financial entity (such as accounts, loans, assets) or financial activity (such as account-to-account transfers, deposits and withdrawals from accounts, computing taxes). Each object may have mathematical and logical equations associated with it to model a financial action. Within the software program, a user generates each graphical object, fills in the pertinent information about the object and then places the object onto a time-line. The program allows manipulation of these graphical financial objects by the user using a graphical user interface. The program allows the financial activity of each financial object to be concurrently simulated modeling past, current, and planned financial behavior. The program tightly binds current spending and budgeting with future spending and budgeting, by comparing actual financial activity to the modeled activity, and then extending this model into the future.

In analyzing a budget, the user could begin by simulating financial activity modeled by all graphical financial objects, starting with the earliest date in the past up to the present. The result of this analysis would graphically show discrepancies between the modeled financial activities and the actual activities. Means are provided to adjust the model to correct deficiencies. The user could also implement a planning analysis by extending the model of current financial activity into the future. A financial activity simulation of the planned financial objects would be performed, from the current date to the last planning date. Areas where data is considered to be invalid (such as negative account balances) would be highlighted for corrective action. Graphical means are provided to correct the invalid data.

Using an object-oriented and graphical user interface, the many simultaneous and interrelated financial activities planned over long periods of time can be effectively viewed, managed, and simulated. The present invention comprises a graphic financial planning tool along with a conventional text-based tool for logging past and current financial information to provide more accurate and realistic budget analyses.

The invention employs object-oriented concepts to manipulate information. Any object-oriented language, such as C++ or Java may be used to implement the present invention. See, for example, *Inside the Object Model, The Sensible Use of C++*, David M Papurt, SIGS Books 1995. In object-oriented parlance, a "class" defines both the data (constants or variables) associated with it and the methods (code that gets executed) defining valid actions for that class. The class data should only be accessed indirectly through its method calls. Objects are the usable instantiations of a class. Hence, there may be only one type of class used by an object-oriented program, but many separate objects whose characteristics and behavior are defined by the class. A class is a generic and abstract concept, while an object is a concrete entity that can be used in an application. It is important to note that the invention's Planning Analysis Tool uses class definitions to instantiate the objects that are graphically manipulated by the user, or read in from files saved on the computer system. Hence, the object-oriented details presented can be directly related to the graphical user interface details described. In the preferred embodiment of the present invention, the user would normally use the Planning Analysis Tool graphical user interface to create and manipulate objects.

A personal financial management software program for recording, predicting, and comparing financial data, having features of the present invention, comprises a graphical user interface for creating, manipulating and displaying objects of object-oriented software programs, a current activity tool comprising objects for entering data from current financial transactions for recording purposes, a planning analysis tool comprising objects for entering projected financial data for a financial activity simulation, and a budgeting analysis tool comprising objects for comparing current financial data with projected financial data. Each object of the software program may be derived from an object class selected from the group consisting of an account class, a transaction class, a category class, and a template class. The account class may comprise objects selected from the group consisting of bank account objects, credit account objects, investment account objects, loan account objects, and mortgage account objects. The transaction class may comprise objects selected from the group consisting of account/account transaction objects, account/category transaction objects, account/transaction transaction objects, category/transaction transaction objects, and close account transaction objects. The category class may comprise an expense category class and an income category class. The expense category class may comprise objects selected from the group consisting of subsistence expense objects, health expense objects, recreation expense objects, transportation expense objects, and luxury expense objects. The income category class may comprise objects selected from the group consisting of investment income objects, retirement income objects, and labor income objects. The template class may comprise objects selected from the group consisting of scheduled spending template objects, scheduled income template objects, and loan payment template objects. The personal financial management software program may further comprise system interface objects to accept user preference defaults for use by the program tools. The personal financial management software program may further comprise cash objects used by transaction objects for tracking cash flows. The personal financial management software program may further comprise a to-do list displayed in the current activity tool for enabling the planning analysis tool to prompt the user to implement projected financial activity. The personal financial management software program may further comprise account data from other financial programs imported into account objects. The personal financial management software program may further comprise category data from other financial programs imported into category objects. The personal financial management software program may further comprise a programming means for enabling the user to create and incorporate a custom object wherein each custom object is derived from an object class selected from the group consisting of an account class, a transaction class, a category class, and a template class. The planning analysis tool may comprise a financial activity simulation of all objects created by the user, the financial activity simulation modeling all financial activity from the earliest entered date in the past to the latest future date entered. The financial activity simulation may identify and graphically depict discrepancies and shortfalls in the modeled transactions. The financial activity simulation may be adjusted to eliminate discrepancies and shortfalls, and to provide a more accurate fit with actual financial activity.

A method for recording, predicting, and comparing financial data using a personal financial management software program, having features of the present invention, comprises creating, manipulating, and displaying objects of object-oriented software programs by a graphical user interface, entering data from current financial transactions for recording purposes using objects of a current activity tool, entering projected financial data for simulating financial activity using objects of a planning analysis tool, and comparing current financial data with projected financial data using objects of a budgeting analysis tool. The objects may belong to object classes comprising an account class, a transaction class, a category class, and a template class derived from a time/value class. The category class may comprise an expense category class and an income category class. The method may further comprise accepting user preference defaults by system interface objects for use by the program tools. The method may further comprise tracking cash flows by cash objects used by transaction objects. The method may further comprise enabling the planning analysis tool to prompt the user to implement projected financial activity by a to-do list displayed in the current activity tool. The method may further comprise importing account data from other financial programs into account objects. The method may further comprise importing category data from other financial programs into category objects. The method may further comprise enabling the user to create and incorporate custom objects into the personal financial management software program. The method wherein simulating financial activity may comprise simulating the financial activity of all objects created by the user from the earliest entered date in the past to the latest future date entered. The method wherein simulating financial activity may further comprise identifying and graphically depicting discrepancies and shortfalls in the simulated transactions. The method wherein simulating financial activity may further comprise adjusting objects to eliminate discrepancies and shortfalls, and providing a more accurate fit with actual financial activity. A computer software program on a computer-readable medium incorporating the method recited above.

A computer-implemented method for personal financial management, having features of the present invention comprises the steps of creating, manipulating, and displaying objects of object-oriented software programs by a graphical user interface, entering data into objects belonging to an account class, a category class, and a transaction class based on past, current, and projected financial transactions, defining objects belonging to a template class that associate common activities to a financial transaction comprising objects of an account class, a category class, and a transaction class, simulating financial activity due to all objects representing financial transactions from the earliest entered date in the past to the latest future date entered, tracking cash flows by use of cash objects, identifying and graphically depicting discrepancies and shortfalls in the simulated transactions, comparing current financial data with projected financial data based on objects representing financial transactions, adjusting object data to eliminate and minimize discrepancies and shortfalls, and to provide a more accurate fit with actual financial activity, and displaying a to-do list for prompting the user to initiate planned actions. A computer software program contained on a computer-readable medium may incorporate the method recited above. A computer may be programmed to perform the steps in the computer-implemented method as recited above.

A personal financial management system for recording, predicting, and comparing financial data, having features of the present invention, may comprise a graphical user interface for creating, manipulating and displaying objects of object-oriented software programs, a current activity tool comprising objects for entering data from current financial transactions for recording purposes, a planning analysis tool comprising objects for entering projected financial data for a financial activity simulation, and a budgeting analysis tool comprising objects for comparing current financial data with projected financial data. The personal financial management system wherein the objects may belong to object classes comprising an account class, a transaction class, a category class, and a template class derived from a time/value class.

The personal financial management system may further comprise system interface objects to accept user preference defaults for use by the program tools. The personal financial management system may further comprise cash objects used by transaction objects for tracking cash flows. The personal financial management system may further comprise a to-do list displayed in the current activity tool for enabling the planning analysis tool to prompt the user to implement projected financial activity. The personal financial management system may further comprise account data from other financial programs imported into account objects. The personal financial management system may further comprise category data from other financial programs imported into category objects. The personal financial management system may further comprise a programming means for enabling the user to create and incorporate custom objects into the personal financial management software program. The personal financial management system wherein the planning analysis tool may comprise a financial activity simulation of all objects created by the user, the financial activity simulation modeling all financial activity from the earliest entered date in the past to the latest future date entered.

BRIEF DESCRIPTION OF THE DRAWINGS

These and other features, aspects and advantages of the present invention will become better understood with regard to the following description, appended claims and accompanying drawings where:

FIG. 10 depicts a register of current financial transactions;

FIG. 43 depicts a possible partial implementation in C++ programming language of the Transaction object class shown in FIG. 33;

FIG. 44 depicts a possible partial implementation in C++ programming language for an Account-to-Account Transfer Transaction custom class shown in FIG. 38;

FIG. 45 depicts the data and method structure of the Cash data type class; and FIG. 46 depicts a possible implementation in C++ programming language for one Account-to-Account Transfer Transaction custom class method.

DETAILED DESCRIPTION OF THE DRAWINGS

Graphical User Interface Description

Figure 1:
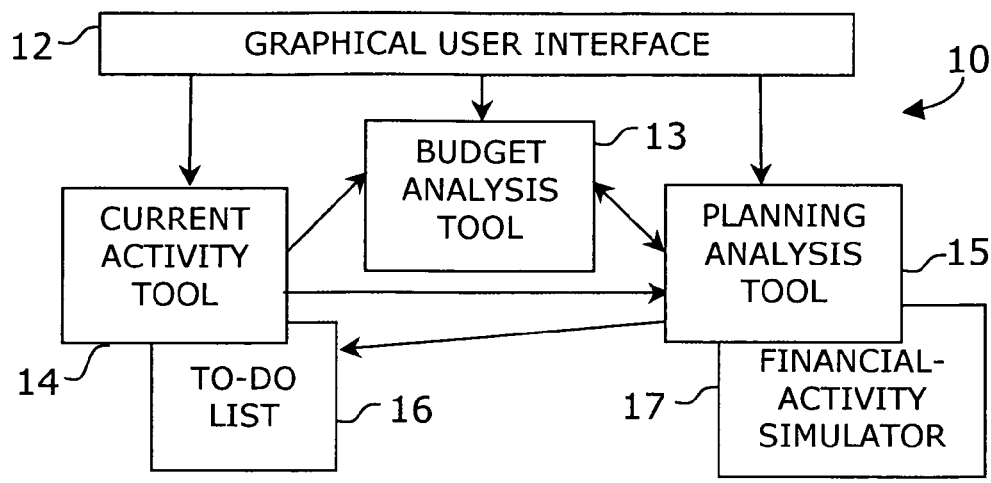
FIG. 1 is a system diagram of a personal financial management system.

FIG. 1 is a system diagram of a personal financial management system 10. The lines and arrows connecting the various tools shown in FIG. 1 represent input and control paths. A graphical user interface (GUI) 12 provides control and display of the system tools. The planning analysis tool 15 enables users to graphically plan and model financial activity, and represents the core tool in the system. The current activity tool 14 enables the user to enter current updates to financial information, such as paying bills from a checking account. The budgeting analysis tool 13 enables the user to compare current financial activity with modeled financial activity. The to-do list 16 enables the planning tool 15 to prompt the user, in the current activity tool 14, if planned financial activity is now due. It is up to the user to heed these items on the to-do list 16 and take appropriate action. A financial activity simulator tool 17 is provided to simulate financial activity modeled by the planning objects entered via the planning tool 15.

Figure 2:
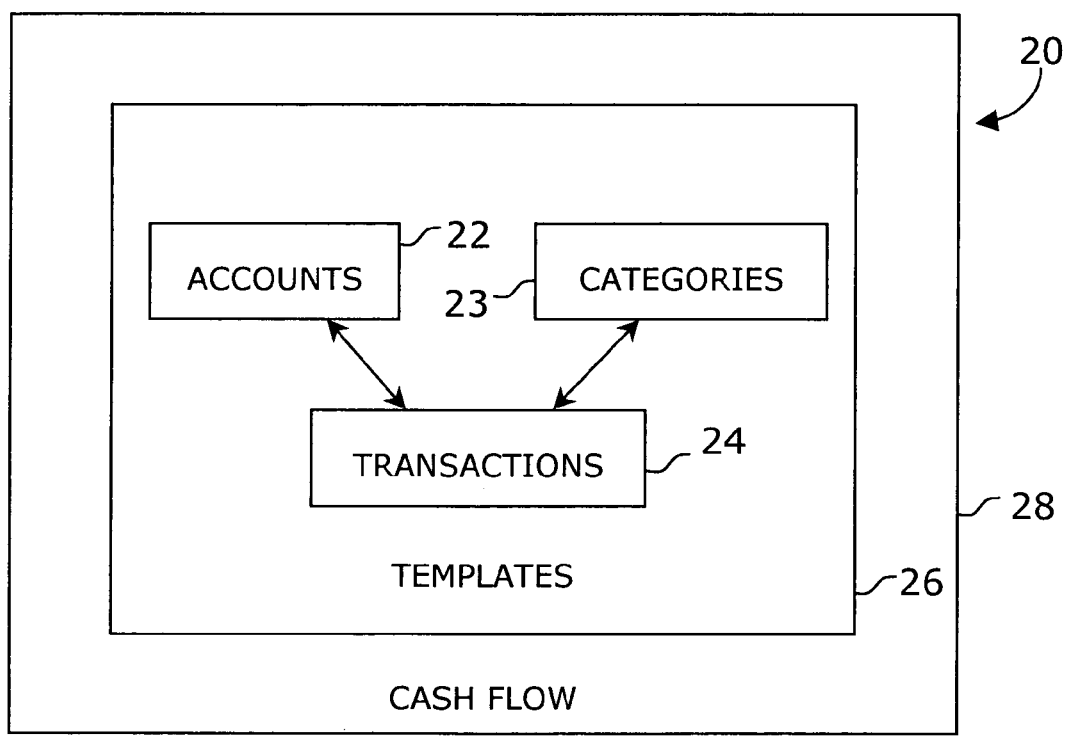
FIG. 2 is a diagram showing a typical relationship between accounts, categories, transactions, and template classes of objects.

FIG. 2 is a diagram 20 showing a typical relationship between objects of the accounts class 22, the categories class 23, the transactions class 24, and template class 26. It is indicative of the information that is managed and manipulated by the system tools. Cash flow 28 between these objects is a value that is tracked and simulated by the system. A transaction object 24 might model a purchase of an item belonging to a category object 23, such as clothing, paid from an account object 22, such as checking. The cash flow 28 is thus shown interacting with four basic objects used by the system to simulate cash flow. Account objects 22 represent accumulations or depletions of cash flow. Cash flow is divided into category objects 23 that allow the budgeting and planning activities fundamental to the system. Transaction objects 24 move cash flow in and out of one or more category objects 23 and account objects 22, and are the only active objects. Template objects 26 allow one or more account objects 22, category objects 23 and transaction objects 24 to be logically grouped together. Such grouping simplifies the graphical representation of financial activity as well as the creation of common financial actions. In addition to the transaction object 24 shown in FIG. 2 that depicts an account/category association, transaction objects may also provide other associations, such as account/account, account/transaction and category/transaction associations.

Figure 3:
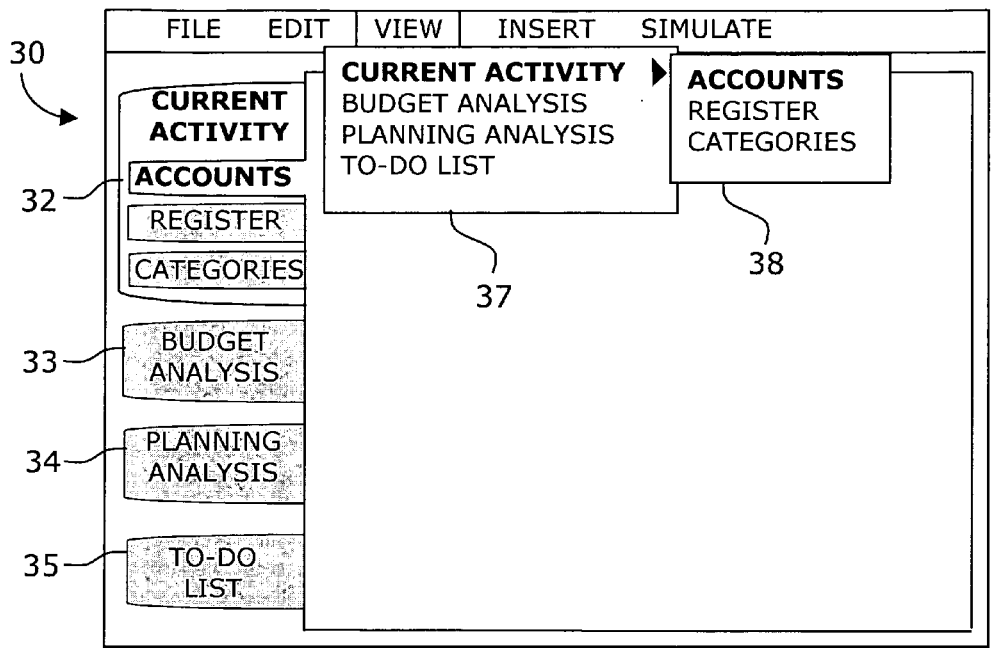
FIG. 3 depicts an opening screen after initiation of the system on a user's computer.

FIG. 3 depicts an opening screen 30 after initiation of the system on a user's computer. Graphical tabs are provided for the three primary system tools, the CURRENT ACTIVITY tool tab 32, the BUDGET ANALYSIS tool tab 33, the PLANNING ANALYSIS tool tab 34, and the TO-DO LIST tab 35. These tabs are typically selected by positioning and clicking a mouse. These selections may also be made by selecting the top menu bar VIEW drop-down box 37 and CURRENT ACTIVITY box 38.

Figure 4:
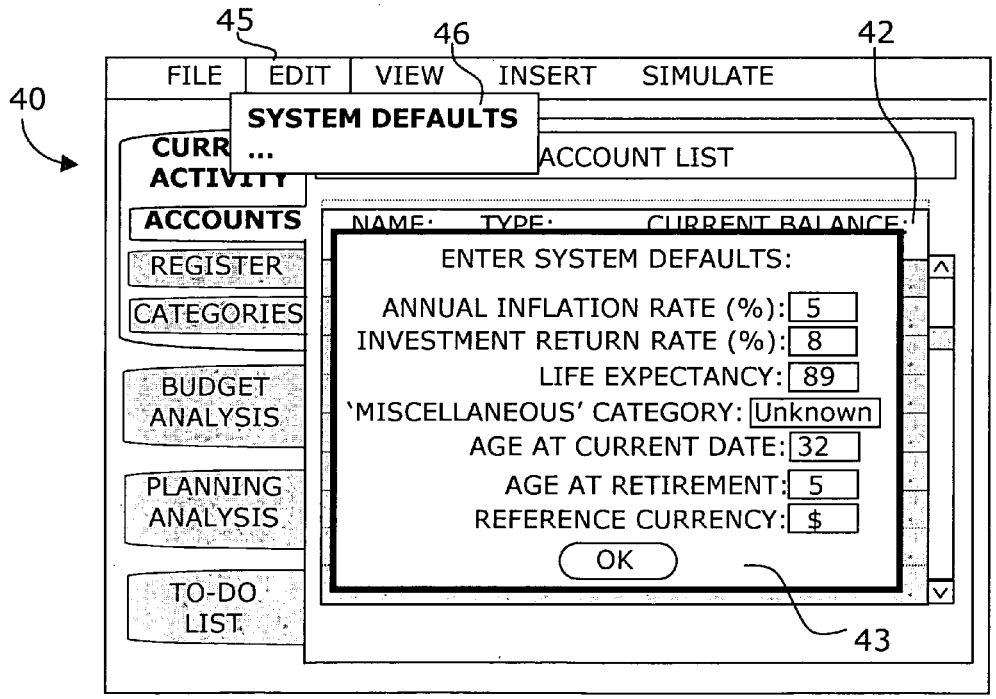
FIG. 4 depicts a system default prompt box after accounts current activity was selected.

FIG. 4 depicts an initial screen 40 with a system default prompt box 43 after CURRENT ACTIVITY-ACCOUNTS were selected the first time after initialization, as highlighted in FIG. 3. Since no data has been entered into the system, the ACCOUNT LIST 42 is empty. The system default prompt box entitled Enter System Defaults 43 accepts user preference data for use by the program's tools. Default data values are provided to aid in the process of setting up the financial configuration. The system default prompt box 43 is also accessible at any time during system operation via the top menu bar by selecting EDIT 45 and SYSTEM DEFAULTS menu item 46.

Figure 5:
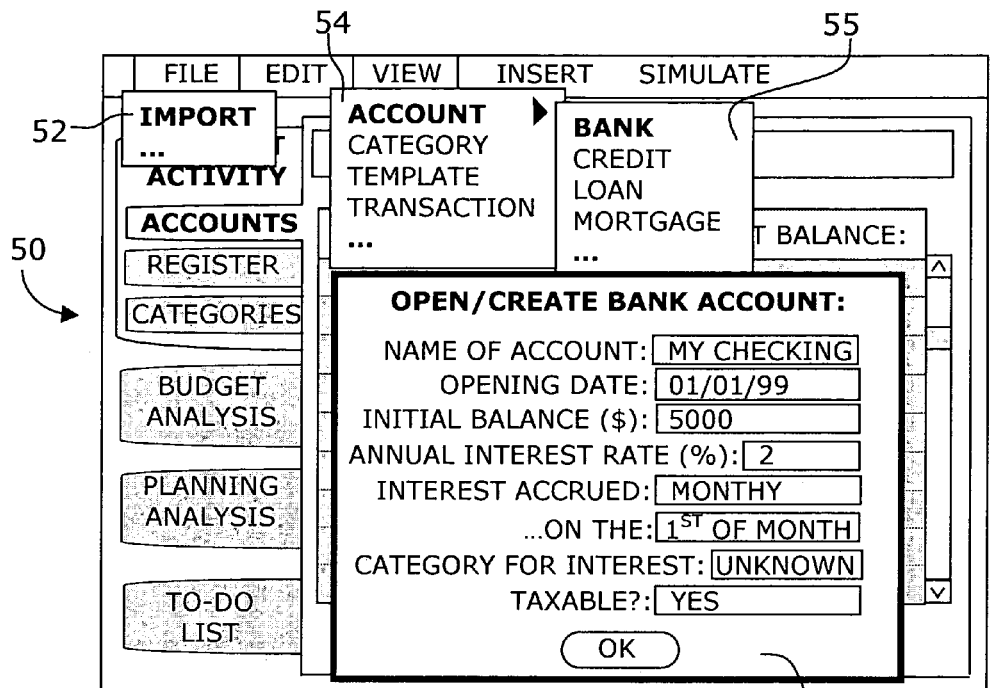
FIG. 5 depicts a screen showing two methods for entering account information into the system.

FIG. 5 depicts a screen 50 showing two methods for entering account information into the system. The user may cause the system to import account data files produced by another financial software program by clicking FILE-IMPORT 52 on the top menu bar. Alternatively, the user can manually enter information for each account in an open/create account box by clicking INSERT-ACCOUNT 54 in the top menu bar and then selecting the account type in the account type box 55. The screen 50 shows the resulting open/create bank account prompt box 56 that results from clicking the BANK selection in the account type box 55. The Open/Create Bank Account prompt box 56 represents a text-based depiction of a bank account object instantiated from the account class of objects. The user enters data into an open/create account prompt box for each account that is part of current financial activity. When data entry is completed, the user clicks the DONE button.

Figure 6:
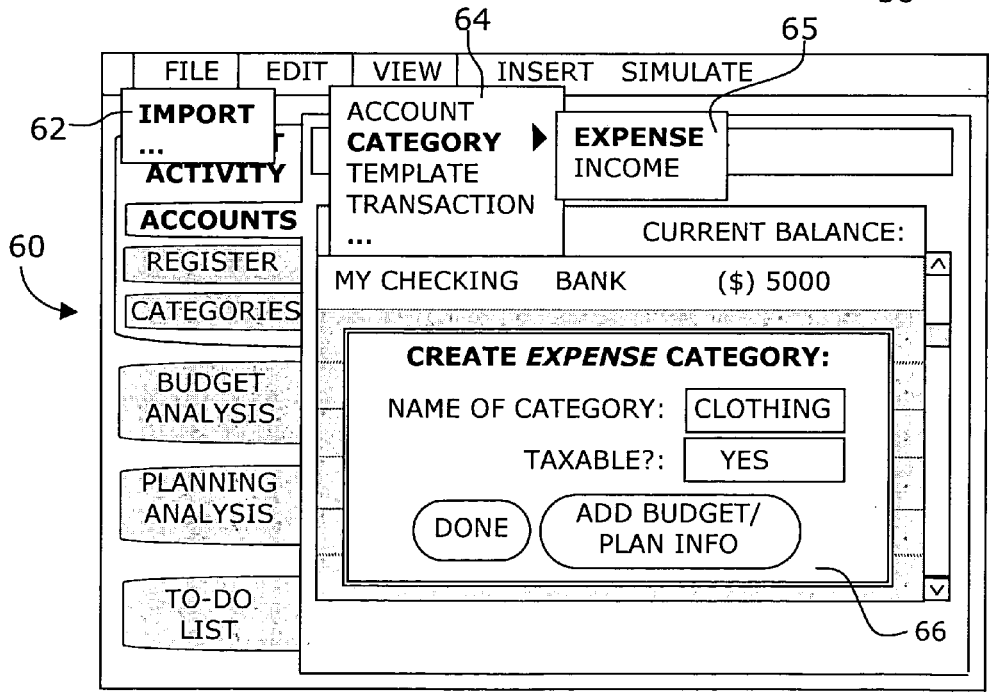
FIG. 6 depicts a screen showing two methods for entering category information into the system.

FIG. 6 depicts a screen 60 showing two methods for entering category information into the system. The user may cause the system to import category data files produced by another financial software program by clicking FILE-IMPORT 62 on the top menu bar. Alternatively, the user can manually enter information for each category in a create category box by clicking INSERT-CATEGORY 64 in the top menu bar and then selecting the category type in the category type box 65. The screen 60 shows the resulting Create Expense Category prompt box 66 that results from clicking the EXPENSE selection in the category type box 65. The Create Expense Category prompt box 66 represents a text-based depiction of an expense category object instantiated from the category class of objects. The user enters data into a create category prompt box and clicks the DONE button for each expense or income category that is part of current financial activity. However, extended information may be entered for the selected category by clicking the ADD BUDGET/PLAN INFO button, which causes the prompt box shown in FIG. 7 to pop up.

Figure 7:
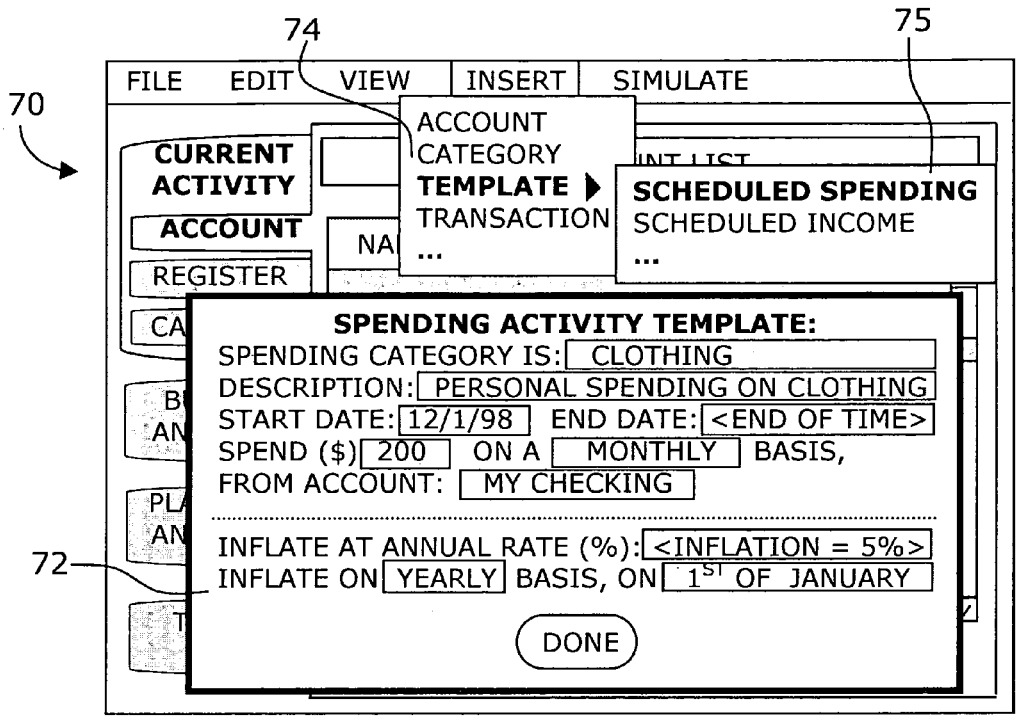
FIG. 7 depicts a screen showing a prompt box for entering extended budgeting and planning information for a category template.

FIG. 7 depicts a screen 70 showing a Spending Activity Template prompt box 72 for entering extended budgeting and planning category information. This prompt box 72 may be accessed through the create category prompt box 66 shown in FIG. 6. Alternatively, the user can click the INSERT-TEMPLATE tab 74 on the top menu bar and then select the template type in the template type box 75. The screen 70 shows the resulting Spending Activity Template prompt box 72 for use with categories. This prompt box 72 is used to create a template object that models and simulates regular spending for a selected category. The spending activity template creates a purchase transaction object that associates an existing account object with a category object. The cash flow from a designated account (My Checking) to a category (Clothing) will be simulated by the system via the purchase transaction object. It is important to note that this template not only can model current financial activity (for budgeting purposes), but can also simulate future financial activity (for planning analysis). This budgeting and planning information may also be optionally generated automatically by the system by fitting a template object to past financial activity. The user enters the information into the prompt box 72 and clicks the DONE button.

Figure 8:
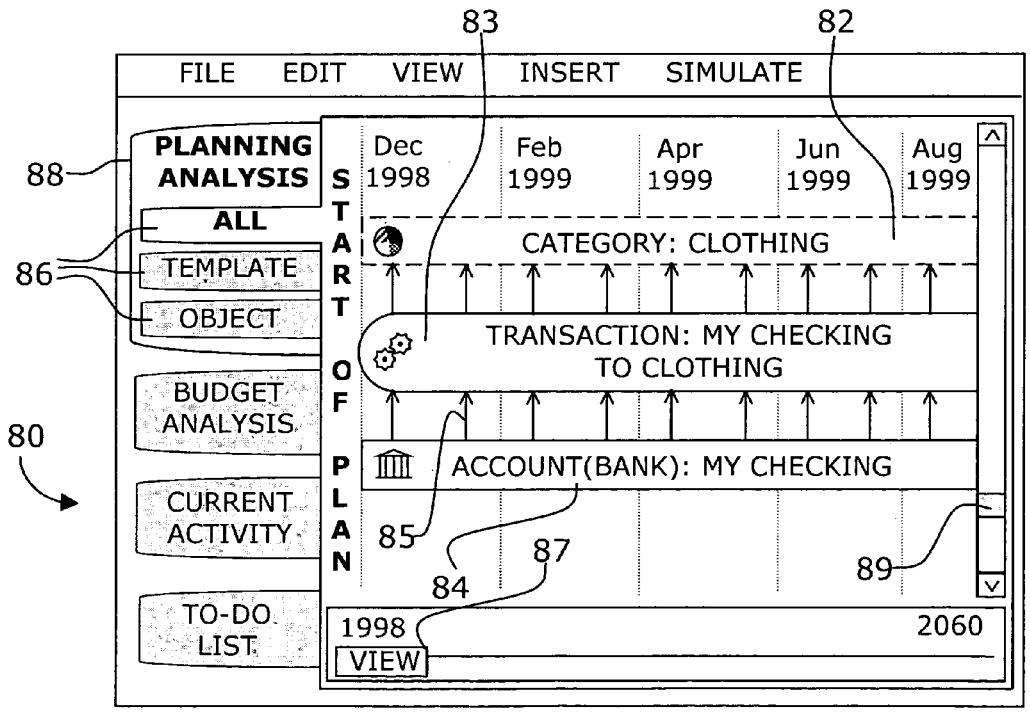
FIG. 8 depicts a graphical representation of the extended budgeting and planning information entered in FIG. 7.

FIG. 8 depicts a graphical representation 80 of the budgeting and planning information entered in FIG. 7. This screen 80 is available anytime the planning analysis tool is selected by the user by clicking the PLANNING ANALYSIS tab 88. Sub tabs 86 within the PLANNING ANALYSIS tab 88 change the way objects are viewed: the PLANNING ANALYSIS-ALL tab shows all entered objects (including objects within template objects); the PLANNING ANALYSIS-TEMPLATE tab views template objects; and the PLANNING ANALYSIS-OBJECT tab shows only objects associated with a specific object. Directed lines 85 represent scheduled cash flow from My Checking account 84 to the Clothing category 82 via My Checking to Clothing transaction 83. The transaction 83 performs the cash flow transfers 85. In this view, time is shown increasing from left to right. The VIEW box 87 on the bottom of the screen 80 indicates the snapshot in time the graphical view is displaying, either past or future. Dragging the VIEW box 87 with a mouse would change the time period to be viewed. Similar to the description above, the screen 80 is a graphical depiction of an underlying template object that contains a transaction object (My Checking to Clothing 83) that associates an account object (My Checking 84) with a category object (Clothing 82). The user may reveal other graphical objects by dragging the scroll bar cursor 89 up and down.

Figure 9:
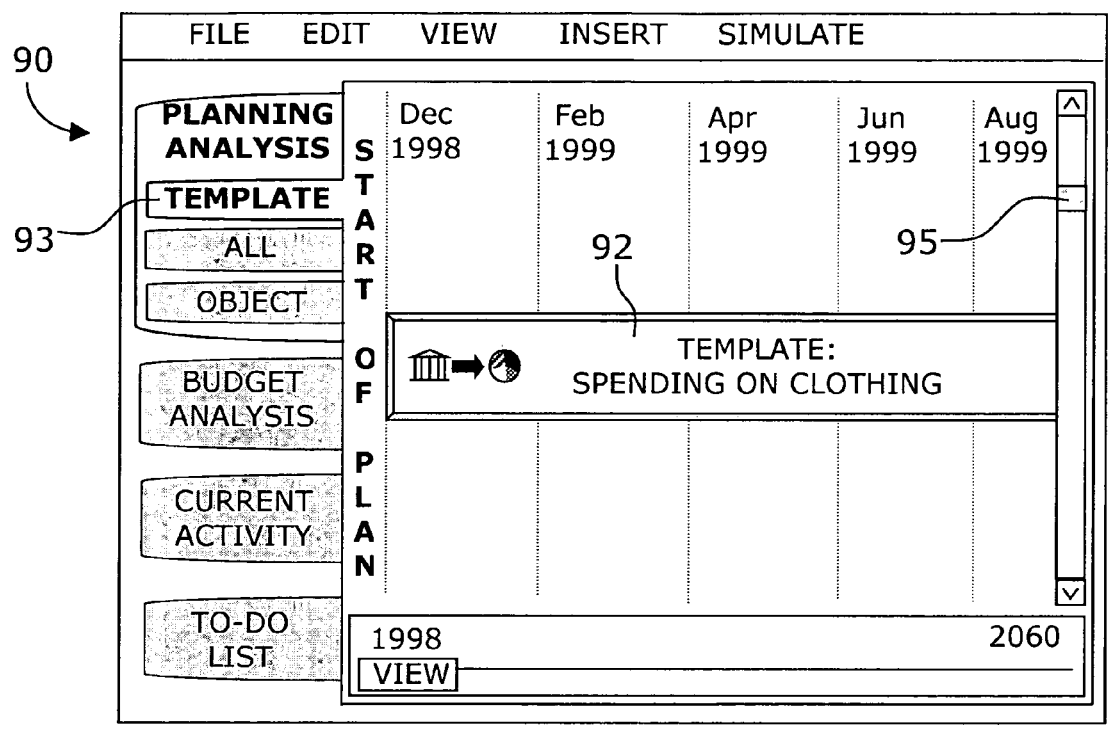
FIG. 9 depicts a condensed view of the objects shown in FIG. 8.

FIG. 9 depicts a condensed view 90 of the template object 92 shown in FIG. 8. This screen 90 may be selected by clicking the PLANNING ANALYSIS-TEMPLATE tab 93 on the screen 90. Template objects are associations that allow grouping of account, category and transaction objects into logical collections. Template objects allow more complex financial information to be hidden from graphical view, simplifying the manipulation of overall financial information. The user may reveal other graphical objects by dragging the scroll bar cursor 95 up and down.

FIG. 10 depicts a screen 100 containing a register 102 of current financial transactions. This screen 100 may be selected by clicking the CURRENT ACTIVITY-REGISTER tab 104 on the screen 100. When account and category information have been entered into the system, day to day financial activity is entered into the system using a register 102. The user enters amount and category information for each transaction conducted. Detailed budgeting information 103 is associated with each transaction, and presented in the lower half of the screen. The detailed budgeting information 103 shown in FIG. 10 represents the information previously entered in the discussion of FIG. 7, and is shown after the Clothing transaction 105 is selected by the user. The sub tab CURRENT ACTIVITY-ACCOUNTS 106 displays a list of created accounts. The sub tab CURRENT ACTIVITY-CATEGORIES 107 lists created categories.

Figure 11:
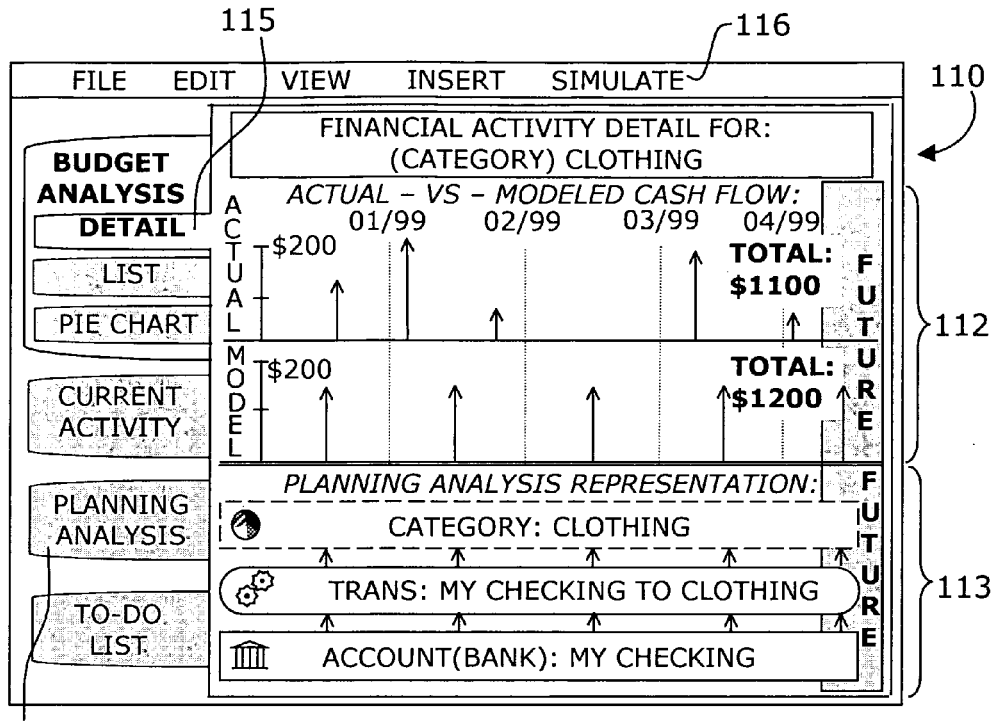
FIG. 11 depicts a screen showing a graphical view of a selected transaction.

FIG. 11 depicts a screen 110 showing a graphical view of the cash flow associated with the selected transaction 105 of FIG. 10. It is selected by clicking the BUDGET ANALYSIS-DETAIL tab 115. This screen shows the result of simulating modeled financial activity after selecting the SIMULATE menu item 116 (detailed later). This view provides emphasis to the fusion of the current actual financial information entered in the description of FIG. 10, with the modeled and simulated information entered in the description of FIGS. 7 and 8. The screen 110 provides a graphical representation of Actual versus Modeled Cash Flow 112 for the selected category (Clothing). Discrepancies between actual and modeled financial activities may be addressed using this view, with the goal of updating the financial objects in the model to minimize these differences. Minimizing the differences between actual and modeled activities provides a more realistic budget for current activities and provides a firm foundation for predicting future financial activity as the model is extended into the future. The screen 110 also provides a symbolic representation of cash flow 113 for the selected category. This representation 113 shows the graphical view associated with this transaction as previously described in the discussion of FIG. 8. Note that the cash flow plot 112 is the sum of all transactions that may affect the selected category. Each of these transactions would be displayed in the symbolic representation 113 in the lower graphical view of the screen 110. Note that this sub view 113 could also be viewed by selecting the PLANNING ANALYSIS tab 117.

Figure 12:
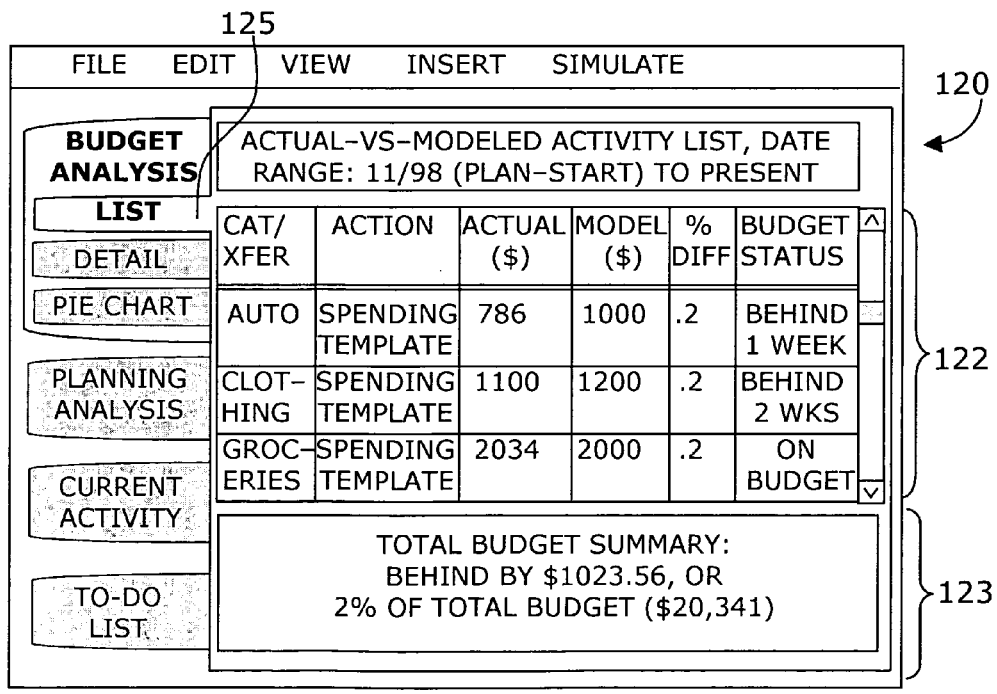
FIG. 12 depicts a screen showing a summary of all transactions associated with each category modeled in the system.

FIG. 12 depicts a screen 120 showing a summary of all transactions 122 associated with each category modeled in the system. Also shown on the lower part of the screen 120 is the Total Budget Summary 123. This view is selected by clicking the BUDGET ANALYSIS-LIST tab 125. Items shown in FIG. 12 may be highlighted and then displayed graphically, as shown in FIG. 11, by clicking the DETAIL tab.

Figure 13:
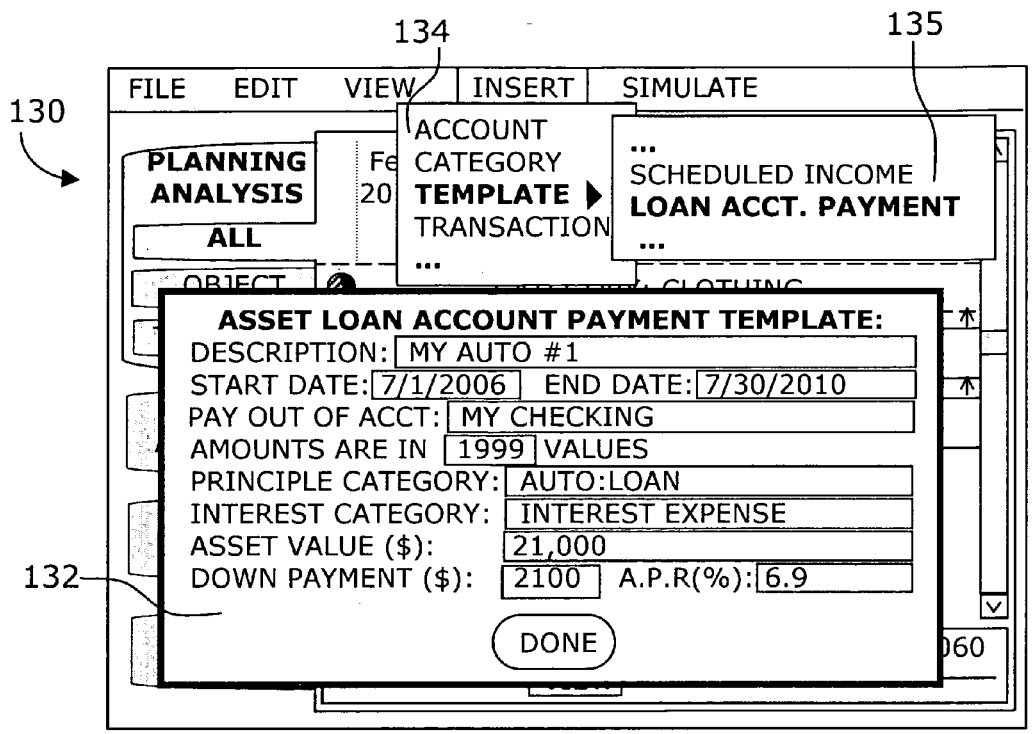
FIG. 13 depicts a screen showing a prompt box for entering data into an asset loan account payment template displayed in the planning analysis tool.

FIG. 13 depicts a screen 130 showing a prompt box 132 for entering data into an Asset Loan Account Payment Template, to be created in the planning analysis tool. This prompt box 132 may be accessed by clicking the INSERT-TEMPLATE 134 on the top menu bar and then selecting the template type in the template type box 135. The Asset Loan Account Payment Template creates a loan transaction object that associates an existing account object with a loan account object (also created). The cash flow from the designated account (My Checking) to the new loan account (My Auto #1) will be simulated by the system.

Figure 14:
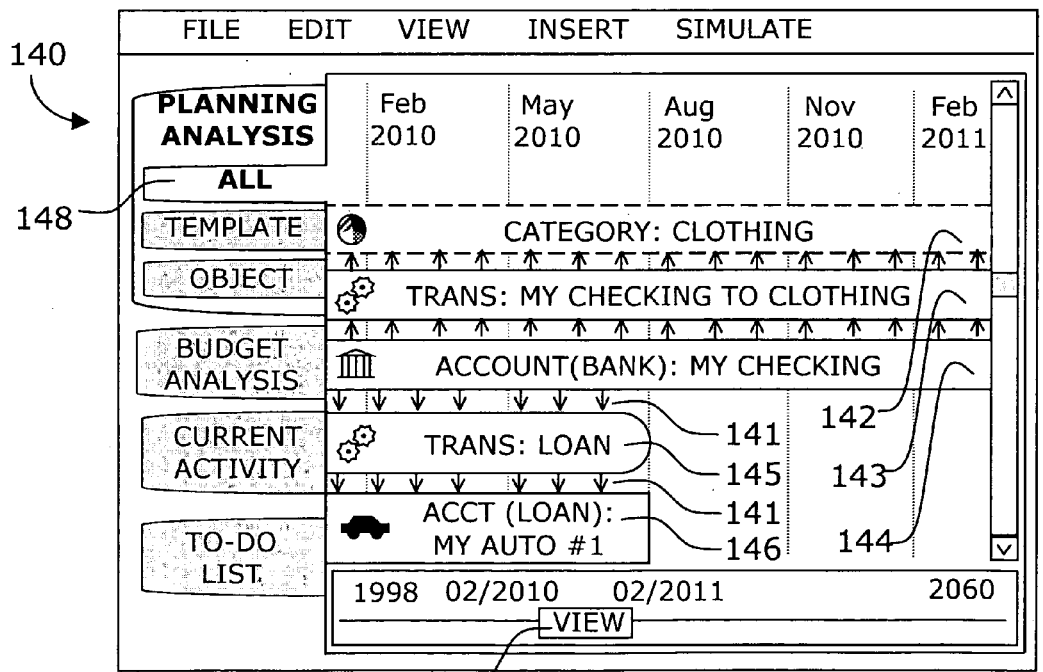
FIG. 14 depicts a graphical representation of extended budgeting and planning information entered in FIG. 7 for a clothing purchase and FIG. 13 for an auto loan.

FIG. 14 depicts a graphical representation 140 of extended budgeting and planning information entered in FIG. 7 for a clothing purchase transaction 143 and FIG. 13 for an auto loan transaction 145. This screen 140 is available anytime the planning analysis tool is selected by the user by clicking the PLANNING ANALYSIS-ALL tab 148. Directed lines 141 represent cash flows from My Checking account 144 to the Clothing category 142 via My Checking to Clothing transaction 143. The directed lines 141 also represent cash flows from My Checking account 144 to the Auto Loan #1 account 146 via Loan transaction 145. The transactions 143 and 145 perform the cash flow transfers 141. In this view, time is shown increasing from left to right. The VIEW box 147 on the bottom of the screen 140 indicates the snapshot in time the graphical view is displaying, either past or future. Dragging the VIEW box 147 with a mouse would change the time period to be viewed. Similar to the description above, the screen 140 is a graphical depiction of transaction objects that associate an account object with a category object or another account object.

Figure 15:
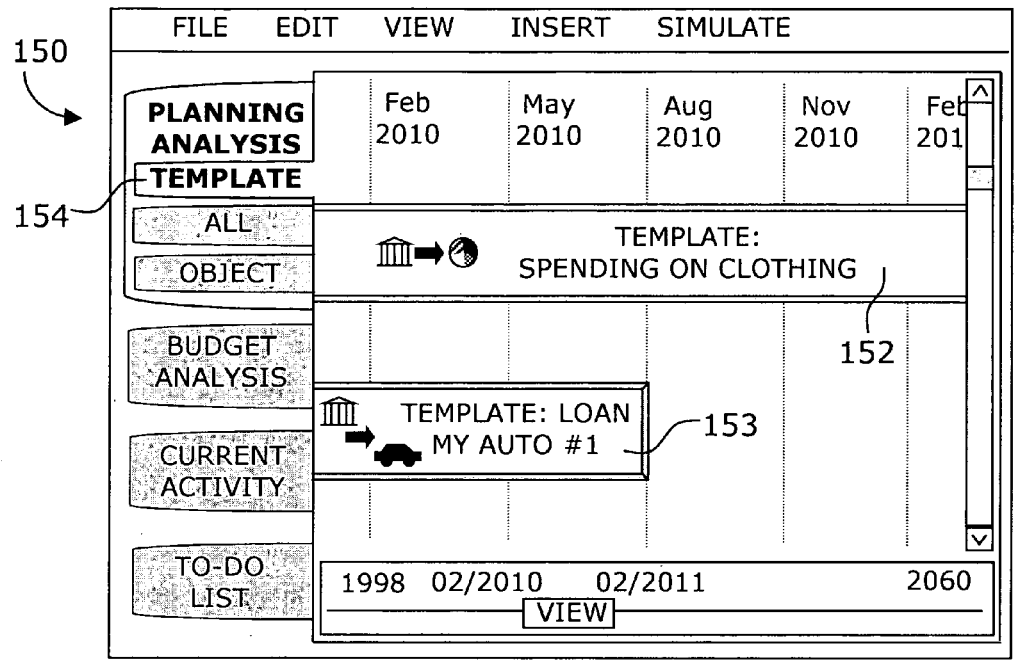
FIG. 15 depicts a condensed view of the objects shown in FIG. 14.

FIG. 15 depicts a condensed template view 150 of the objects 142, 143, 144, 145, 146 shown in FIG. 14. This screen 150 may be selected by clicking the PLANNING ANALYSIS-TEMPLATE tab 154 on the screen 150. Template objects are associations that allow grouping of account, category and transaction objects into logical collections. Template objects allow more complex financial information to be hidden from graphical view, simplifying the manipulation of overall financial information, as shown by comparing FIG. 15 to FIG. 14.

Figure 16:
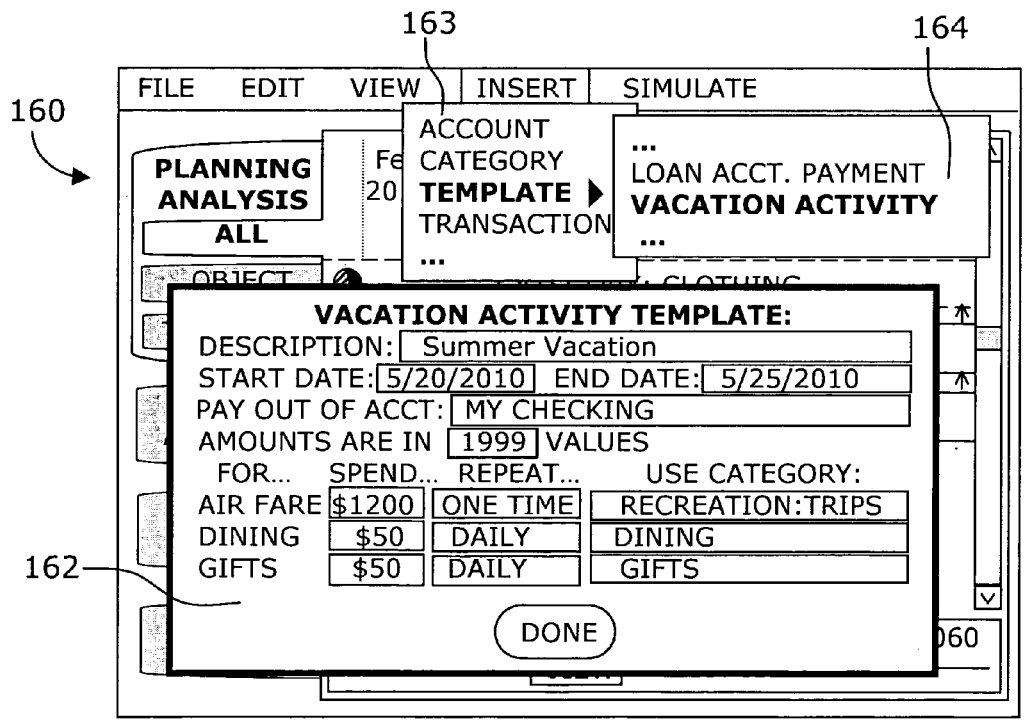
FIG. 16 depicts a screen showing a prompt box for entering data into a vacation activity template displayed in the planning analysis tool.

FIG. 16 depicts a screen 160 showing a prompt box 162 for entering data into a Vacation Activity Template displayed in the planning analysis tool. This prompt box 162 may be accessed by clicking the INSERT-TEMPLATE 163 on the top menu bar and then select the template type in the template type box 164. The screen 160 shows the resulting Vacation Activity Template prompt box 162 for use with vacation planning activity. This prompt box 162 is used to create a template object that represents and simulates regular spending for selected categories, such as recreation, dining and gifts. The Vacation Activity Template prompt box 162 is a text-based depiction of an underlying template object that creates a transaction object that associates an existing account object with several category objects. The cash flow from a designated account (My Checking) to designated categories (Recreation, Dining and Gifts) will be simulated by the system.

Figure 17:
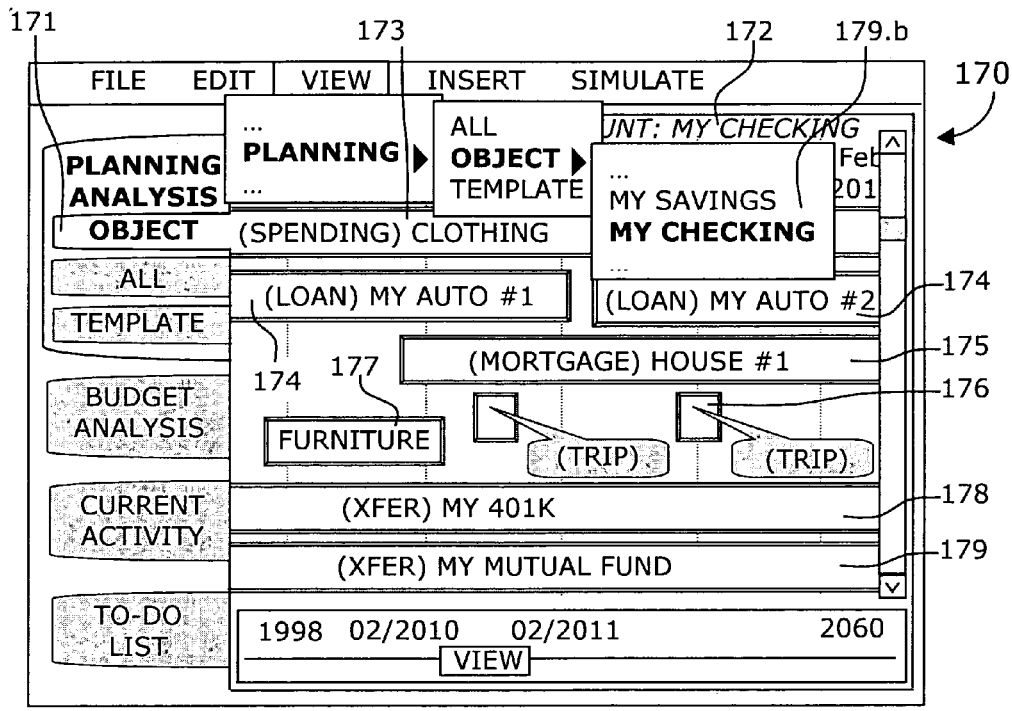
FIG. 17 depicts a screen showing a typical planning view after transactions have been entered into the system.

FIG. 17 depicts a screen 170 showing a typical planning view 172 after transactions have been entered into the system. In particular, the screen 170 shows all objects that associate with the account object My Checking. These objects include Clothing category 173, My Auto loan accounts 174, House #1 mortgage account 175, Trip category 176, Furniture category 177, 401K account 178, and My Mutual Fund A account 179. This view 172 may be accessed by clicking the PLANNING ANALYSIS-OBJECT tab 171. The user could use the pull-down menu 179-*b* to view all objects associated with a select object other than My Checking.

Figure 18:
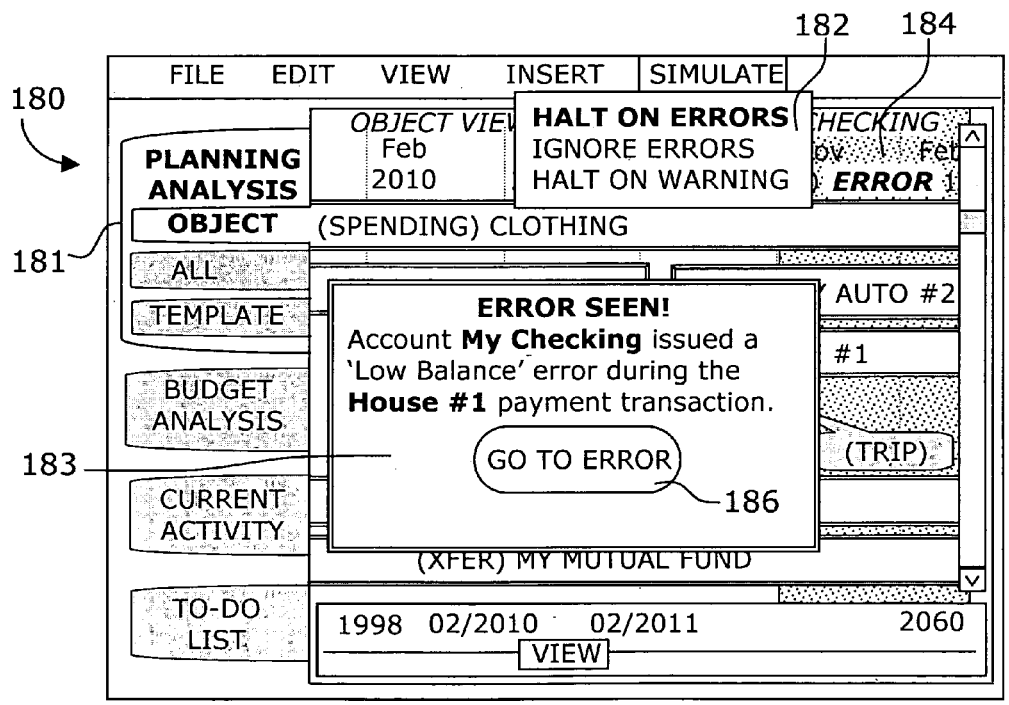
FIG. 18 depicts a screen showing a typical result of a financial activity simulation.

FIG. 18 depicts a screen 180 showing a typical result of a financial activity simulation 184. The financial activity simulation is activated by making a selection in the drop-down box 182 after clicking SIMULATE in the upper tool bar. The financial activity simulation shows a result 184 where a mortgage payment has caused a simulated negative balance in the account My Checking. An error warning box 183 is displayed describing the error. Objects may be changed at any time and a financial activity simulation recomputed to investigate fixes to error conditions. A financial activity simulation is executed on all financial objects, including on objects modeling past and current activity (allowing for comparison to actual activity for budgeting analysis as in FIG. 11), and including on objects modeling planned activity into the future (as in FIG. 18).

Figure 19:
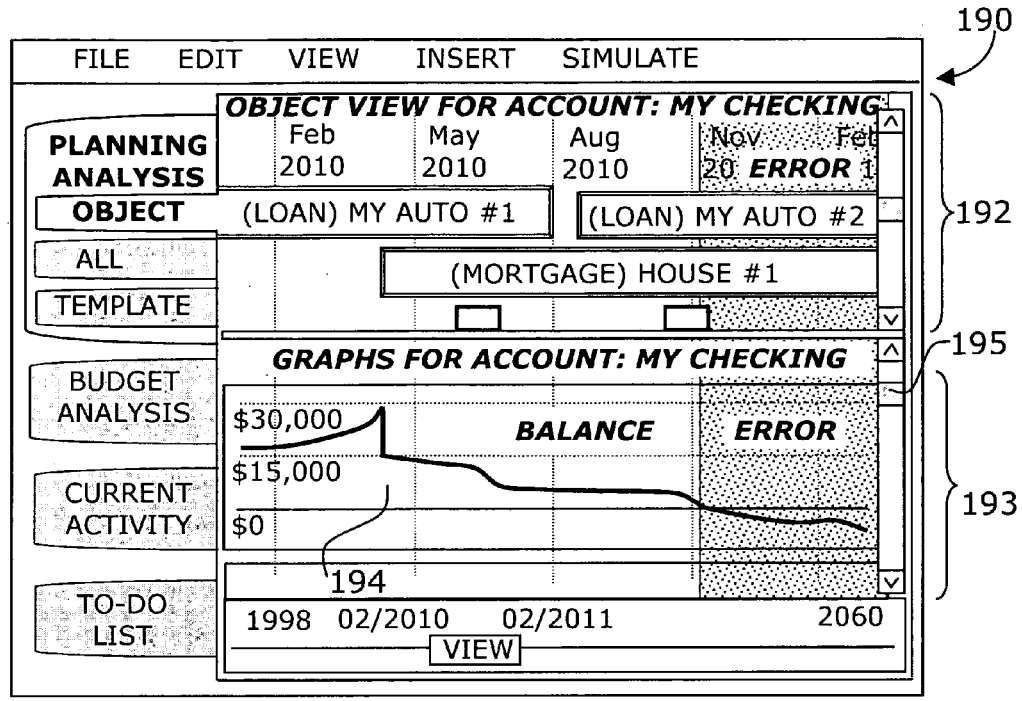
FIG. 19 depicts a screen showing the simulated balance for My Checking that results from clicking the Go to Error button on the screen shown in FIG. 18.

FIG. 19 depicts a screen 190 showing a graphical representation 194 of the balance for My Checking that results from clicking the GO TO ERROR button 186 on the screen 180 shown in FIG. 18. The view screen 180 of FIG. 18 divides into an upper portion 192 containing the planning analysis object view, and a lower portion 193 providing a graphical plot 194 of the My Checking account balance that went below zero and triggered the error in the financial activity simulation. The graphical plots are designed to provide insight into the factors leading up to the error condition. The user is expected to make the necessary adjustments to the financial planning objects that have caused the error condition, then recompute a financial activity simulation as shown in FIG. 18. The user may select any object displayed in the upper portion 192 to display post-simulation graphical plots associated with that particular object.

Figure 20:
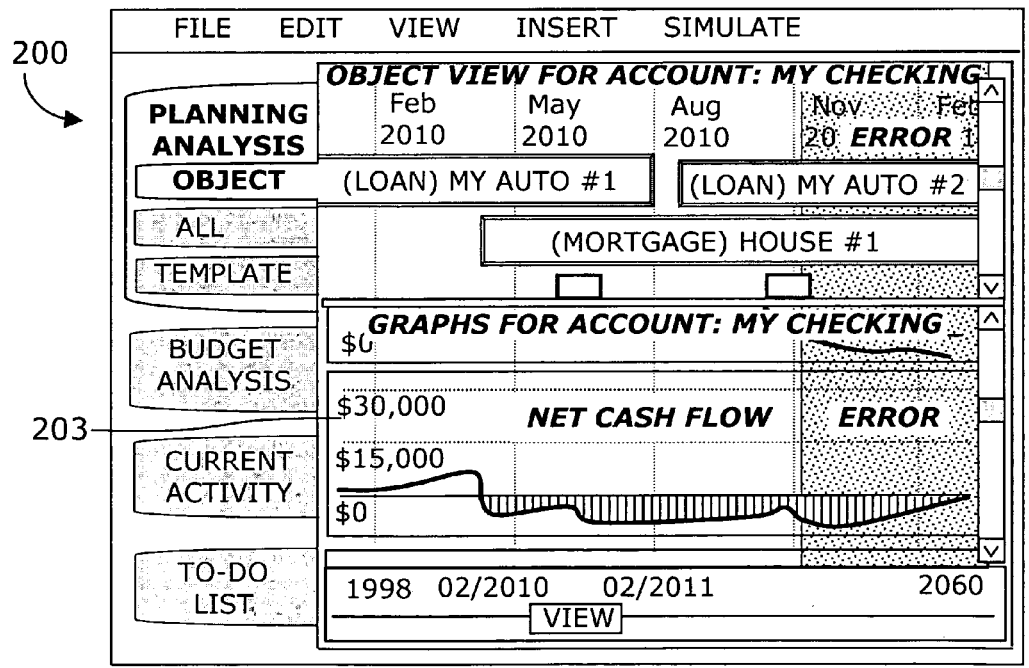
FIG. 20 depicts a screen showing a graphical representation of net cash flow for My Checking that results from dragging the scroll bar cursor shown in FIG. 19 downward.

FIG. 20 depicts a screen 200 showing a graphical representation of net cash flow for My Checking that results from dragging the scroll bar cursor 195 shown in FIG. 19 downward. This reveals another graphical plot 203 for the My Checking account. This plot depicts net cash flow for the My Checking account, in this example showing consistent negative cash flow (outflow from the account) prior to the account balance going below zero.

Figure 21:
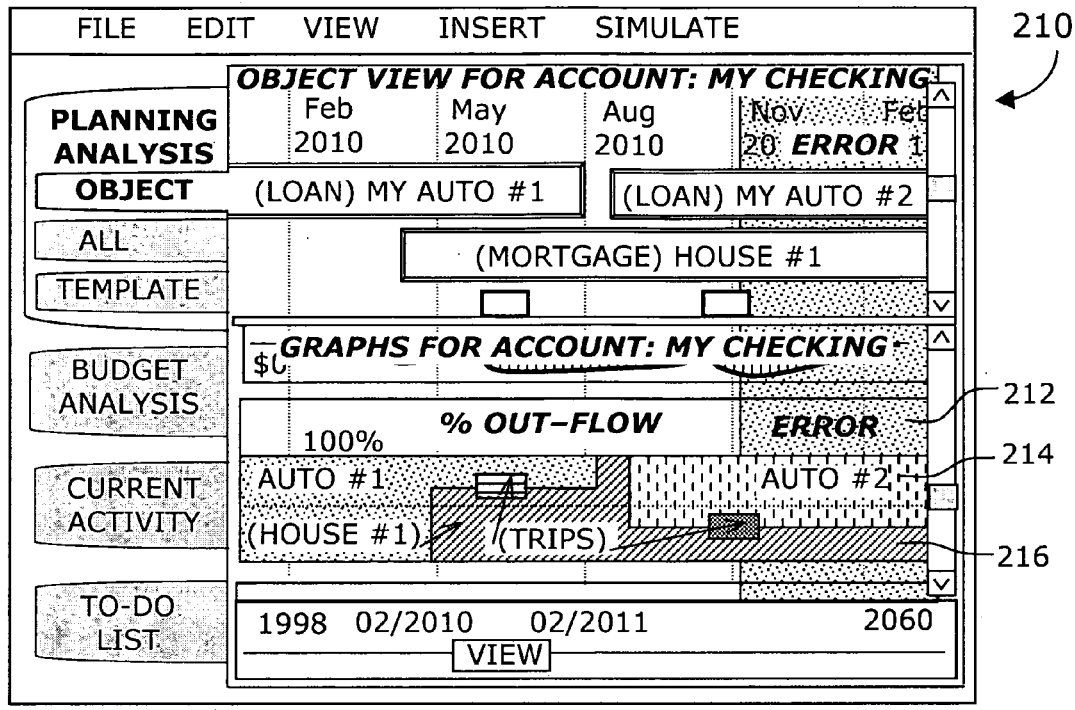
FIG. 21 depicts a screen showing a graphical representation of percentage outflow for My Checking that results from dragging the scroll bar cursor shown in FIG. 19 further downward.

FIG. 21 depicts a screen 210 showing a graphical representation of percentage outflow for My Checking that results from dragging the scroll bar cursor 195 shown in FIG. 19 further downward, revealing another graphical plot 212 for the My Checking account. This plot 212 depicts relative negative cash flow for the My Checking account, in this example showing the influence of a mortgage payment (House #1) 216 and auto payment (Auto #2) 214 prior to the My Checking account balance going below zero.

Figure 22:
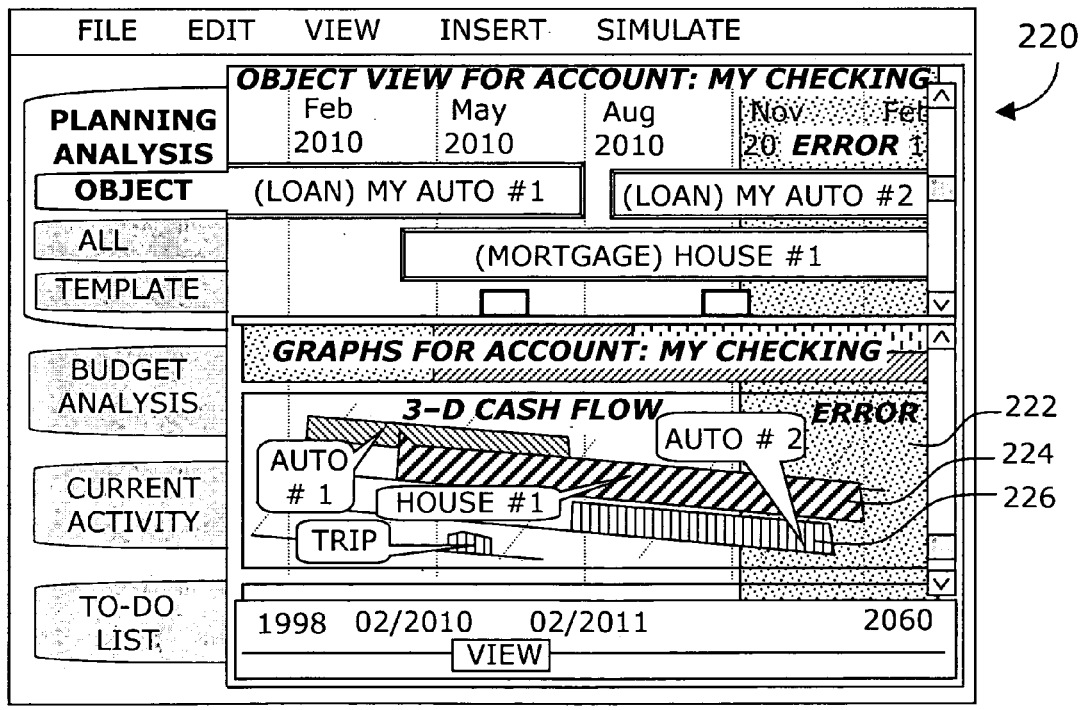
FIG. 22 depicts a screen showing a three dimensional graphical representation of cash flow for My Checking that results from dragging the scroll bar cursor shown in FIG. 19 further downward.

FIG. 22 depicts a screen 220 showing a three dimensional graphical representation of cash flow for My Checking that results from dragging the scroll bar cursor 195 shown in FIG. 19 further downward, revealing another graphical plot 222 for the My Checking account. This plot depicts cash flow for My Checking account in a three dimensional manner, in this example showing the influence of a mortgage payment (House #1) 224 and auto payment (Auto #2) 226 prior to My Checking account going below zero.

Object-Oriented Description

Figure 23:
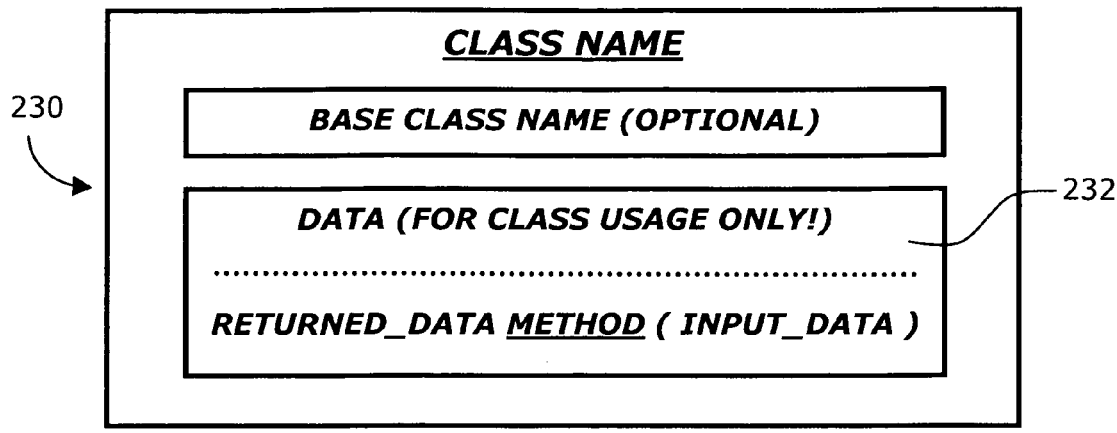
FIG. 23 depicts the graphical form that is used to summarize class content.

FIG. 23 depicts the graphical form 230 that is used to summarize class content. Entries located above the dotted line 232 in the content diagram list the data members controlled and maintained by the class, while entries below the dotted line depict valid actions (methods) that a user can make on objects instantiated from the class. Each method call shown will optionally denote input data (to be evaluated by the object's method software), and returned data (information returned from the object's method software). The graphical representation of FIG. 23 is meant to provide enough information to allow someone skilled in the art to understand the invention, but it is understood that different specific implementations of each class, while preserving similar overall behavior, are within the scope of the invention. In particular, for brevity, not all 'get' and 'put' information method calls are listed in the class content diagrams for all data members in the class, but are understood to be a part of the class implementation if required. Also, method calls could be renamed, while still providing the same operation, and still be considered within the scope of the invention.

The data input to and output from a class' method calls represent specific types of information, which will also be noted in the class content diagrams of the form shown in FIG. 23. Where no input or output data is required, no data type will be shown in the figures. Cash amounts simulated by the present invention are represented in the class content figured using the 'cash' type designation. The 'cash' data type is itself a class whose instantiated objects are used by the invention to keep track of where 'cash' is sourced from (income or withdrawal) and drained into (expense or deposit). The 'cash' data type is detailed in subsequent discussions.

In the form of FIG. 23, ordinary (non-'cash') numerical information (percentages, computation results, etc.) is given the 'value' type designation. Data with the 'date' type denotes year, month, day, and time-of-day information. Like the 'cash' data type, 'date' data type is also a class. Message data sent between objects is noted with the 'event' type. The 'bool' type is used to show logic data that is considered as either "true" or "false". References to other objects are noted as 'ref' or 'references'. Note that a reference to an object may either be its actual location in the computing device's memory, or else may be a unique text description of the object (like 'My Checking Account') that can be converted by the invention software into the actual memory location. In this description, 'reference' and the familiar software term 'pointer' are used interchangeably. The form of FIG. 23 also indicates any foundation or 'base' classes that the class may be inherited from.

Figure 24:
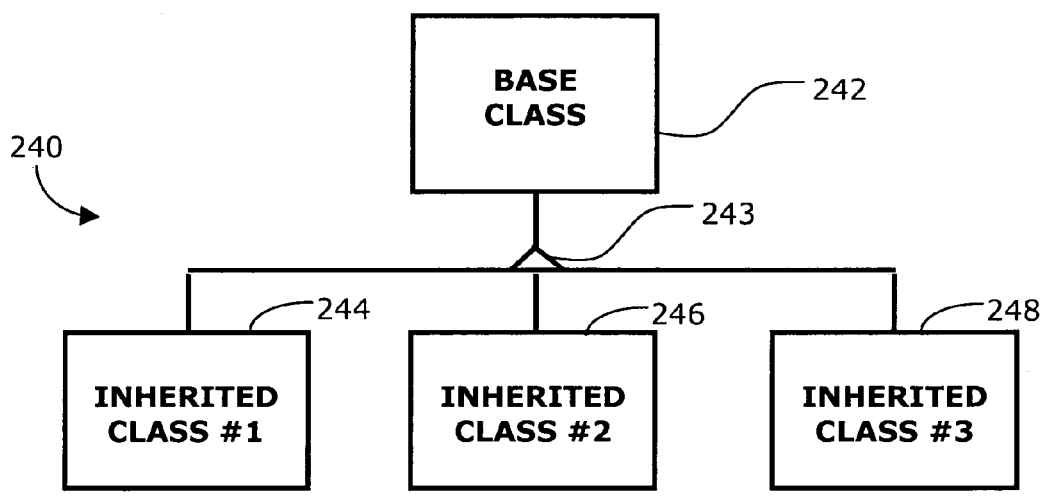
FIG. 24 depicts the object-oriented representation of inheritance.

FIG. 24 depicts the object-oriented representation 240 of inheritance. The representation 240 shows three inherited classes 244, 246, 248 inherited from a base class 242. Inheritance is a fundamental object-oriented concept, and is represented by a vertical line terminated by a triangle 243. Each inherited class 244, 246, 248 receives its fundamental methods and data from the base class 242.

Figure 25:
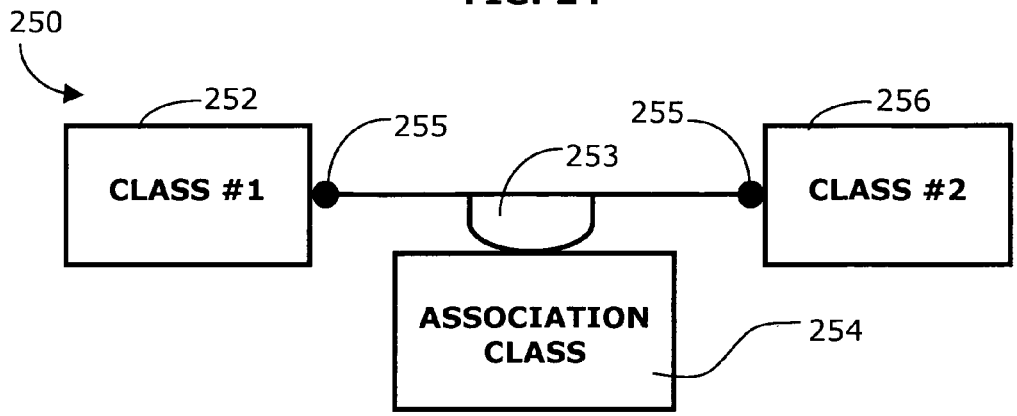
FIG. 25 depicts an Association class.

FIG. 25 depicts an Association class 250. Association classes 254 associate other classes 252, 256 with each other. FIG. 25 shows associations as horizontal lines with an attached semicircle 253. The association class 254 would maintain references in its data section to the objects to be associated. Through these references, an association class object can execute each associated object's method calls. The returned data of one object's method call may be input to another object's method call, thus supporting an association between these two objects. AS shown in FIG. 25, a horizontal line terminated with solid circles 255 indicates that there may be more than one object of a class type in an association.

Figure 26:
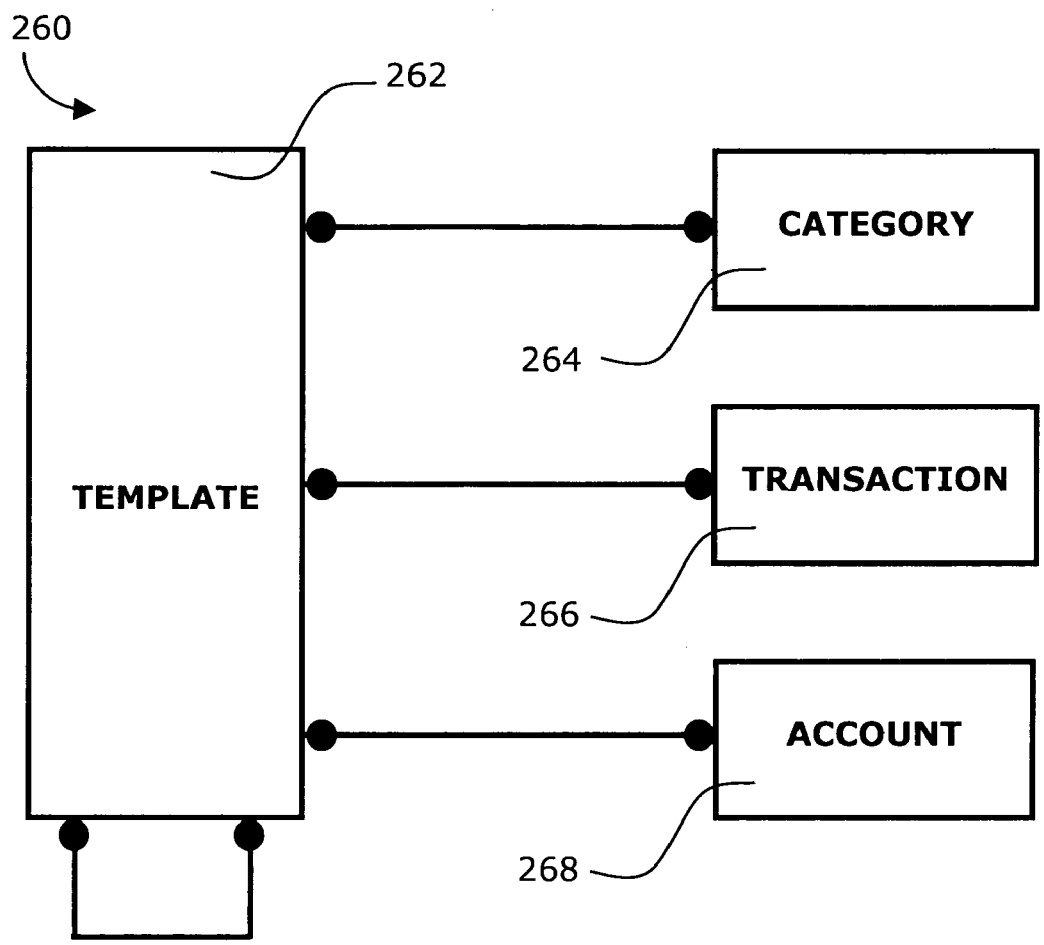
FIG. 26 depicts possible Template class associations.
Figure 27A:
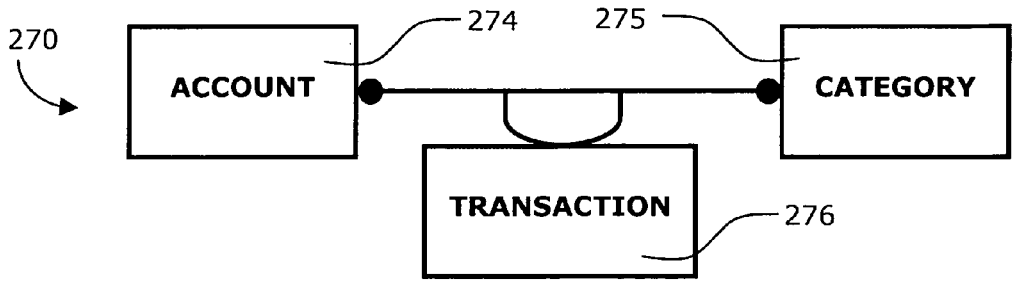
FIG. 27A–FIG. 27D depict some valid associations between primary classes of the invention.
Figure 27B:
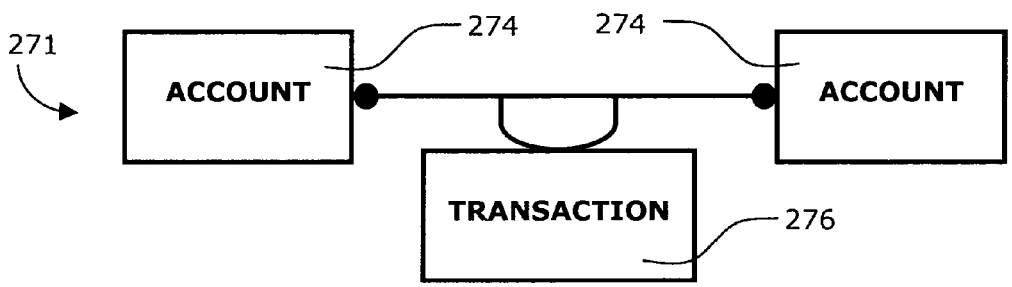
Figure 27C:
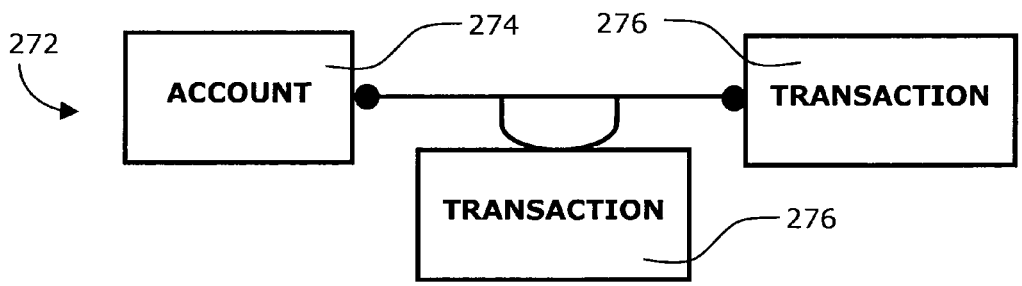
Figure 27D:
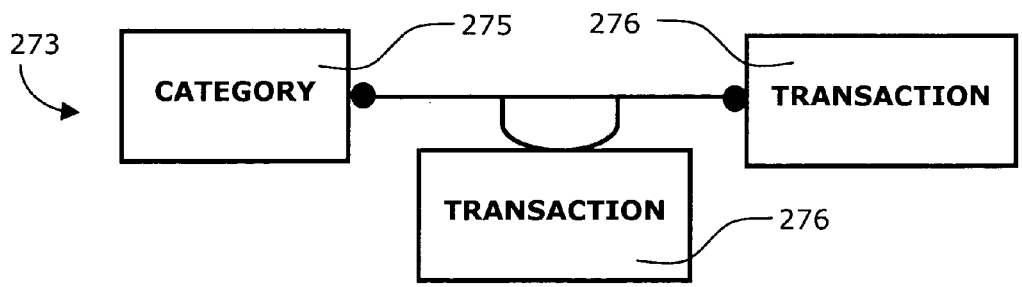

FIG. 26 depicts a representation 260 of possible Template class associations. Three primary classes directly control or track financial activity, including the Category class 364, the Transaction class 266, and the Account class 268. Any combination of these three primary classes can be associated with one or more Template classes 262. Such Template associations allows groupings of objects into logical collections (such as grouping a checking Account object, an account-to-account transfer Transaction object, and a loan Account object, under a 'Auto Loan' Template object per FIG. 15). The Template association concept was first in FIG. 9 as part of the Planning Analysis Tool description. Using the form of FIG. 25, FIG. 26 graphically depicts possible template class associations to the primary classes, and to other templates as well.

FIG. 27A–FIG. 27D depict some valid associations 270, 271, 272, 273 between primary object classes 274, 275, 276 of the invention. Transaction class is an association class type, which via its references can support cash flow and other interactions between objects. Transaction objects 276 are meant to be the main movers of cash flow, using references to Category objects 275 to track cash flow, and to Account objects 274 for modeling cash balances. Hence, Account objects 274 and Category objects 275 are passive, relying on Transaction objects to call their method calls via object references. The Transaction objects 276 can associate with other Transaction objects 276 as well (for example, to allow a tax-computation Transaction to monitor a taxable transfer Transaction from a Mutual-Fund Account to a checking Account).

Figure 28:
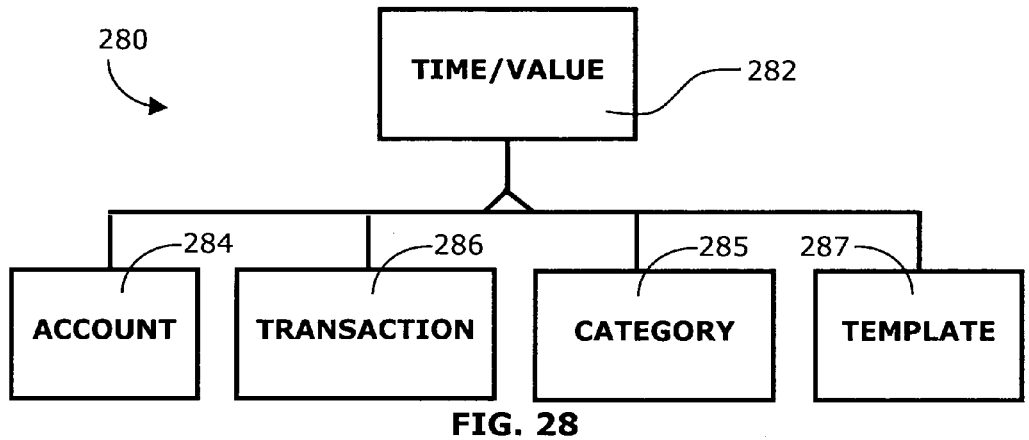
FIG. 28 depicts the inheritance of the primary classes from a Time/Value base class.

FIG. 28 depicts a representation 280 of the inheritance of the primary classes 284, 285, 286, 287 from a Time/Value base class 282. The primary classes comprising Account objects 284, Transaction objects 285, Category objects 286 and Template objects 287 inherent their fundamental data and method calls from a Time/Value class 282. The Time/Value class is detailed in the class content diagram of FIG. 29 (using the form of FIG. 23).

Figure 29:
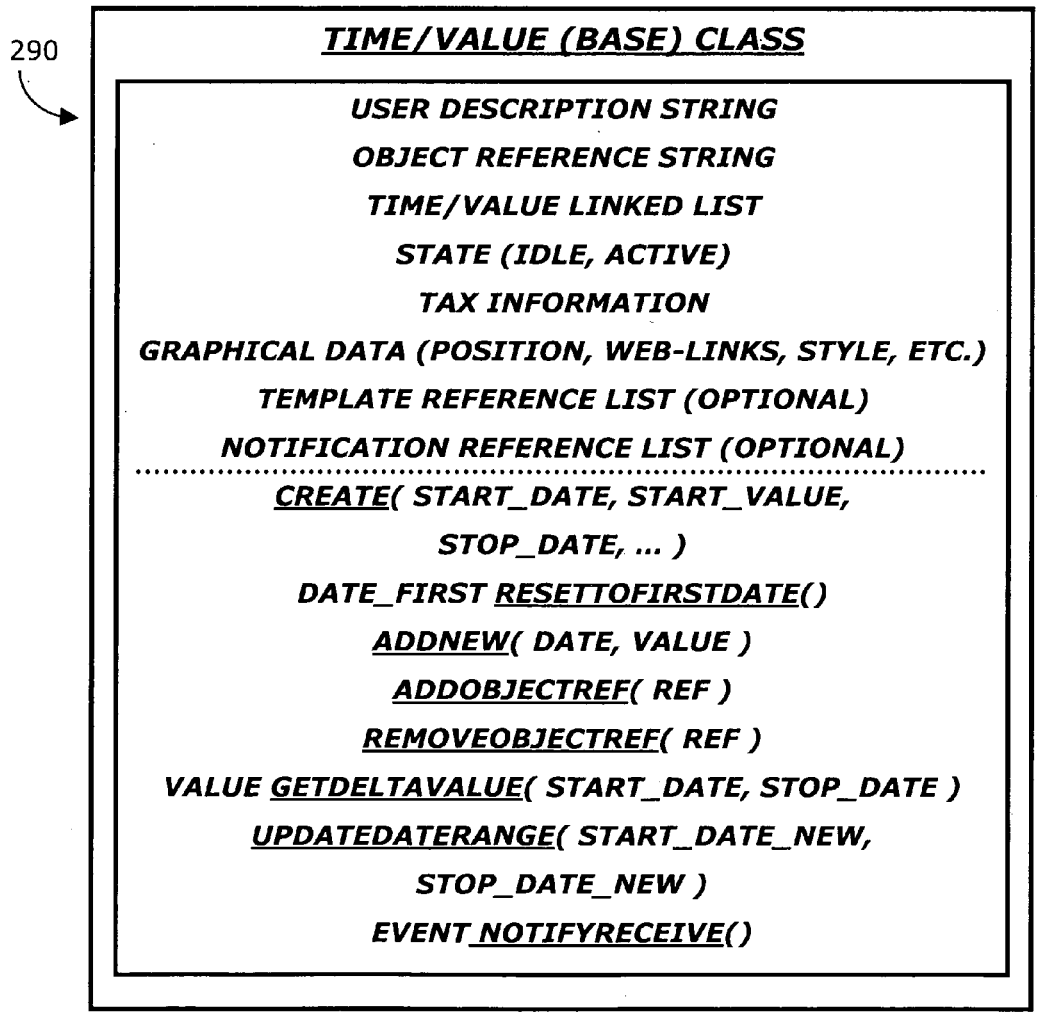
FIG. 29 depicts the data and method structure of the Time/Value base class.

FIG. 29 depicts a representation 290 of the data and method structure of the Time/Value base class. The 'Time/Value Linked List' data structure is used to log values (typically a value or cash amount of some sort) from an object's starting date to its ending date, in date/value pairs, where each date is a 'date' object, described earlier. This log is a linked-list structure, with each date/value pair sorted by ascending date. Account and Category classes that inherit this list store cash accumulations/depletions, while Transaction classes can (optionally) log cash flow amounts over time. After financial activity simulations, the date/value linked list for each object may then be plotted and analyzed, as FIGS. 19, 20, 21, and 22 showed. Other data members of the Time/Value class include the optional 'User Description String', which stores the user's own descriptive text for each instantiated Time/Value object (or objects that have inherited from the Time/Value class). The 'Object Reference String' stores a shorthand text-based descriptive reference that is unique for each object instantiation. This string may be used by one object to refer to another one, for example. The 'State' data member can be used to selectively turn 'off' certain Time/Value objects, say to try various 'what-if' trials with the Planning Analysis Tool's Financial Activity Simulator (see FIG. 18). The 'Tax Information' data member allows each object to be tagged as taxable for tax computation Transaction objects. As will be described, any graphical information associated with an object, as viewed from the various tools in the invention program, is stored in the 'Graphical Data' data section. The Time/Value class also maintains a list of references to other objects to which notification events could be sent. For example, one transaction may wish to pass the result of a computation to another via the 'Notification Reference List'. Using the Time/Value class' 'Template Reference List', an object can send notification that its date range has changed to each Template object that the notifying object may be associated with, allowing each Template to update its own range. For each object an event is targeted to, the Planning Analysis Tool (see FIG. 8) calls the object's 'notifyReceive( )' method. It is understood that other notification techniques may be used to signal information between objects, and still fall under the scope of the present invention.

All classes must have a 'create( )' method such as shown in FIG. 29, which is automatically called whenever an object is first instantiated, and has the job of initializing all data within the object. Since there are generally as many input parameters to the 'create( )' method calls as there are data elements to initialize in the object, ellipsis marks (' . . . ') are used for brevity in the class content figures, with no loss of meaning. The 'create( )' method for a class must also call the 'create( )' method of any class that it may inherit from. It should be noted that in practice, the invention software fills out the 'create( )' method input parameters for the user, as described subsequently. Other method calls listed in FIG. 29 of the Time/Value class are used to extract and manipulate time/value and object-reference information. The Planning Analysis Tool shown in FIG. 8 uses the 'resetToFirstDate( )' method to flush and reset time/value information prior to each financial activity simulation, and uses 'updateDateRange( )' to tell the object that the user has moved or stretched it graphically using the pointing device (which can thus change its actual start and stop dates). The two methods are provided to add and remove objects from the 'Notification Reference List': 'addObjectRef( )' and 'removeObjectRef( )'. The 'addNew( )' method adds a new date/value data point to the 'Time/Value Linked List' data structure, while the 'getvalue( )' method extracts a value stored in the 'Time/Value Linked List' data structure for an input date (useful for tax computation Transaction objects to monitor taxable cash flow, for example).

Figure 30:
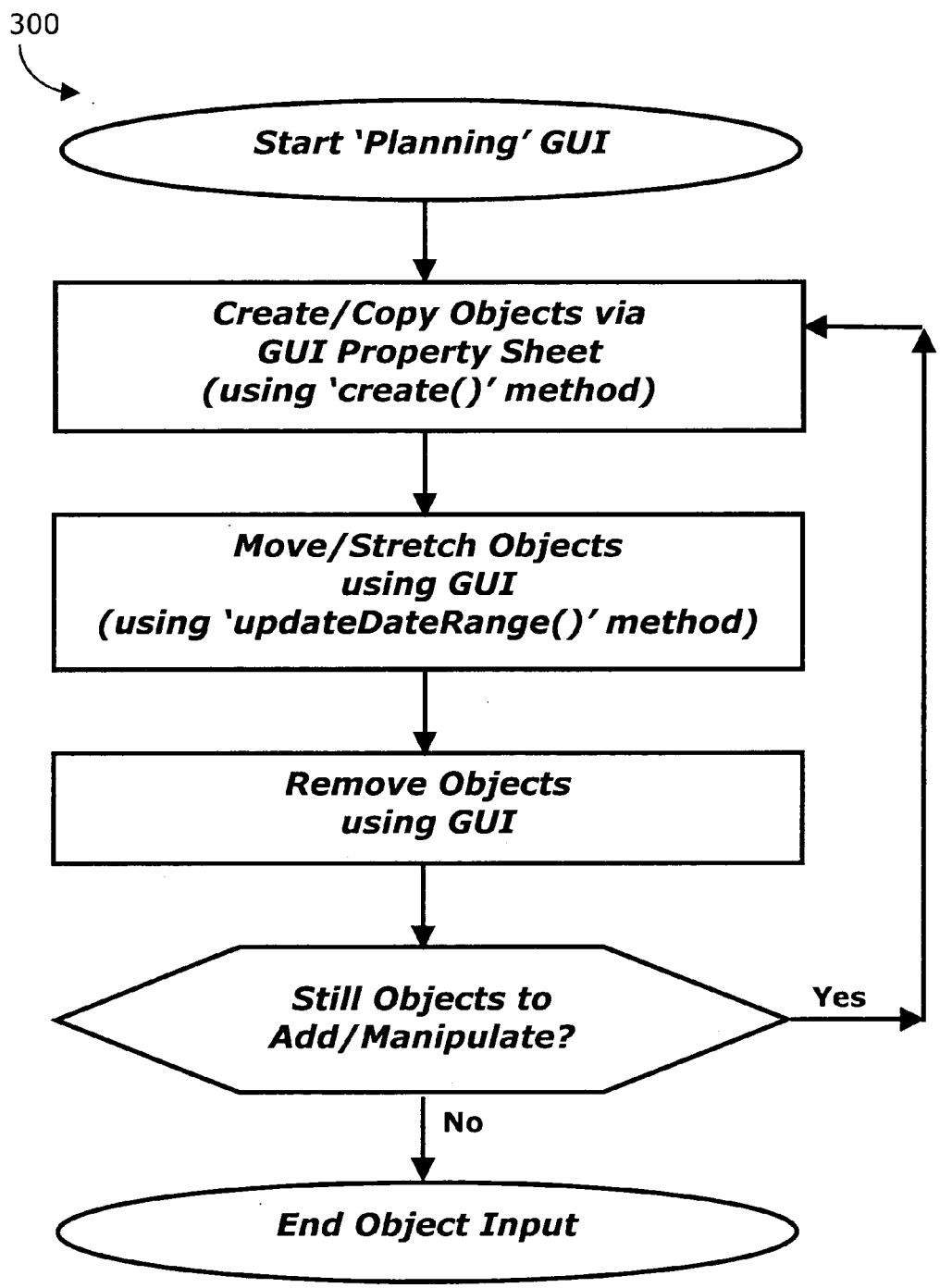
FIG. 30 depicts how the Planning Analysis Tool manipulates financial objects.

FIG. 30 depicts a flow chart 300 showing how the Planning Analysis Tool of FIG. 8 manipulates financial objects. When a financial object is first created by the user in the Planning Analysis Tool, as was shown in FIG. 7, the invention program actually creates an instance of one of the Account, Transaction, or Template classes, by calling the class' 'create( )' method call, then storing the object's data in the computer memory. The Planning Analysis Tool uses a Property Sheet graphical user interface (GUI) to collect the input parameters needed by the object's 'create( )' call from the user, exemplified by FIG. 7. Once created, each object has both a graphical representation as viewed from the invention program's various tools, and a computer-memory representation that can be manipulated by the invention program software.

Hence any actions the user performs on an object using the invention tools causes the invention program to call that object's method calls to translate the user action into an object action. For example, a user may graphically drag or stretch an object left or right in the Planning Analysis Tool using the pointing device, thus changing the object's starting and ending date range. The invention program would then change the object's date range stored in the computer memory by calling the object's Time/Value class' 'updateDateRange( )' method call, since each financial object is an instantiation of some class derived from the Time/Value class. The invention stores graphical information associated with each object, such as where the object is located relative to other financial objects in the invention program, in the Time/Value class' 'Graphical Data' data section.

Figure 31:
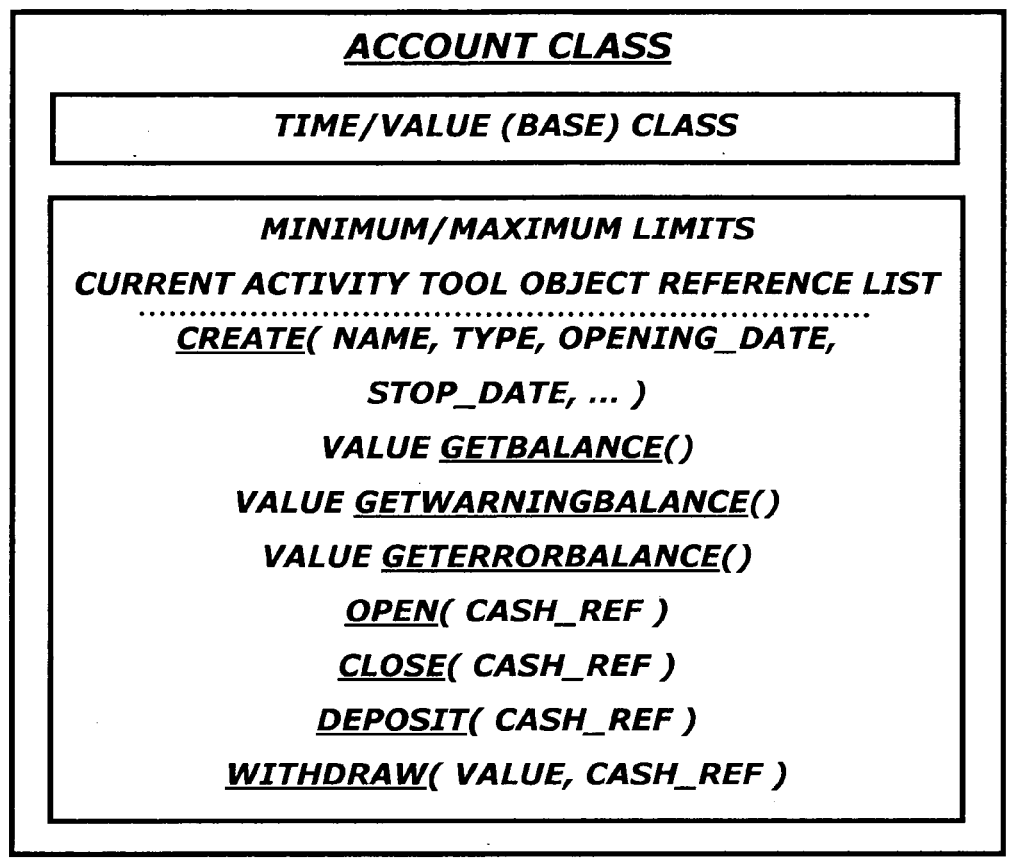
FIG. 31 depicts the data and method structure of the Account class, including the inherited Time/value base class data and method structure.

FIG. 31 depicts the data and method structure 310 of the Account class, including the inherited Time/value base class data and method structure (FIG. 29). The user's designated name for the Account object (for example, 'My Checking') would be stored in the Time/Value class' 'User Description String' field. The date/value pairs stored in the Time/Value base object list typically represent the simulated cash balance of an Account object over time. The first date/value pair in each Account object's list would be its opening date and opening cash balance.

FIG. 31 also shows the data and method calls that are unique to the Account class, such as balance limits used possibly to throw warnings or errors to the user during financial activity simulations. The 'Current Activity Tool Object Reference List' data member allows Account objects created in the Planning Analysis Tool to be associated with the user's actual accounts as maintained by the Current Activity Tool shown in FIG. 10. Such an association supports comparing actual to planned/simulated spending, as shown in the Budget Analysis Tool example of FIG. 11. As with all objects in the invention system, the Account class has a 'create( )' method called by the user with the Planning Analysis Tool of FIG. 8. The three method calls 'getBalance( )', 'getWarningBalance( )' and 'getErrorBalance( )' may be used to determine, respectively, an "Account object" current balance, the balance below which a warning indication is displayed in the Planning Analysis Tool, and the balance below which an error indication is displayed, shown in FIG. 18.

As mentioned previously, Transaction objects are the main movers of the cash flow simulated by the invention system's Financial Activity Simulator tool shown in FIG. 18. For the Account class, cash flow is simulated when select Transaction objects call the remaining four method calls in FIG. 31: 'open( )', 'close( )', 'deposit( )' and 'withdraw( )'. All four methods accept a reference to a 'cash' object (detailed later in FIG. 45) as input data. These Account methods may then update the 'cash' object by calling its 'addToCash( )' (for cash flow out of the Account object) or 'getFromCash( )' (for cash flow into the Account object) method calls, as appropriate. For example, through a reference to an existing Account object, an 'Open Account' Transaction object could call the Account object's 'open( )' method call to simulate opening a bank account for the first time. The Account object's 'open( )' method could then call the input 'cash' object's 'getFromCash( )' method which returns a simulated cash amount that may be used to set the initial Account balance.

Figure 32:
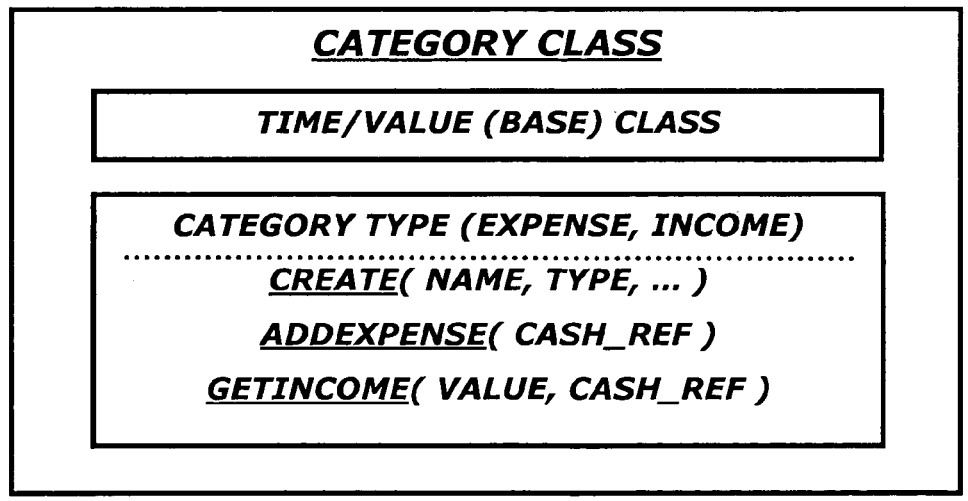
FIG. 32 depicts the data and method structure of the Category class, including the inherited Time/Value base class data and method structure.

FIG. 32 depicts the data and method structure 320 of the Category class, including the inherited Time/Value base class data and method structure. Like the Account class, this class inherits the Time/Value class' data and methods, including the user's designated name for the category, and the use of date/value pairs to log cash balances within each Category object over time. The Category class adds a 'Category Type' data member, as well as two method calls: 'addExpense( )' and 'getIncome( )'. The 'addExpense( )' method call records as an expense the simulated cash value returned by calling the input 'cash' object's 'getFromCash( )' method. Conversely, the Category's 'getIncome( )' method adds the input 'value' to the input 'cash' object via its 'addToCash( )' method, recording the 'value' as income.

Figure 33:
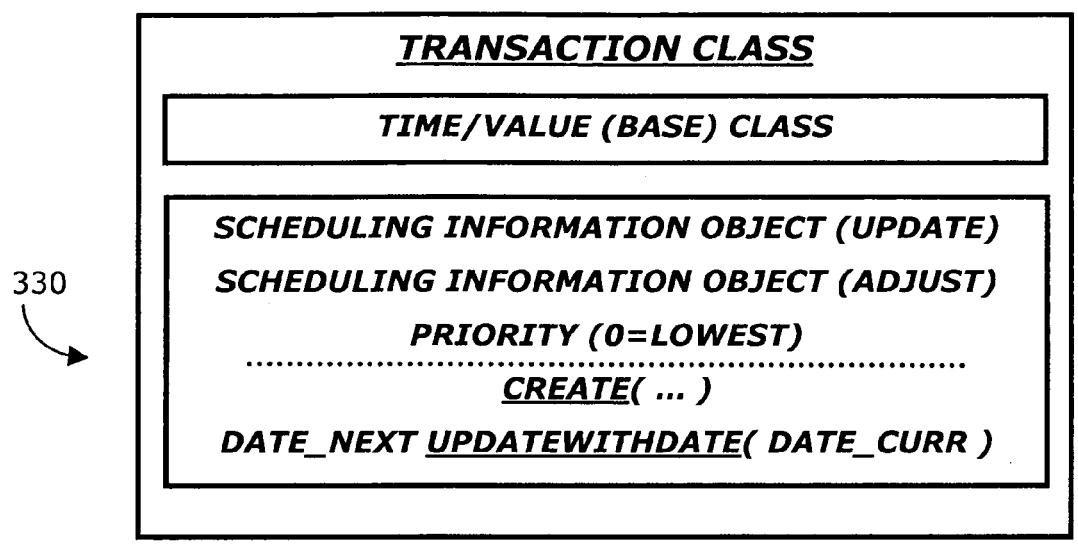
FIG. 33 depicts the data and method structure of the Transaction class, including the inherited Time/Value base class data and method structure.

FIG. 33 depicts the data and method structure 330 of the Transaction class, including the inherited Time/Value base class data and method structure. The Transaction class is used to store the user's description of each Transaction object. The date/value pairs in the Time/Value class may be optionally used by the Transaction object to log accumulated monthly account-to-account withdrawals to date. The Transaction class in FIG. 33 adds two Scheduling Information classes (detailed later in FIG. 37) to its data member list. One (marked 'update') is used to set how often and on what dates the Transaction object will be called by the Financial Activity Simulator of FIG. 18. The other, marked 'adjust', may optionally be used to set how often, and on what dates, the Transaction object should adjust parameters within it (for example, to once a year increase a monthly expense-related transfer amount by the inflation rate). The 'Priority' data member and 'updateWithData( )' method are used by the Financial Activity Simulator, as detailed next.

Figure 34:
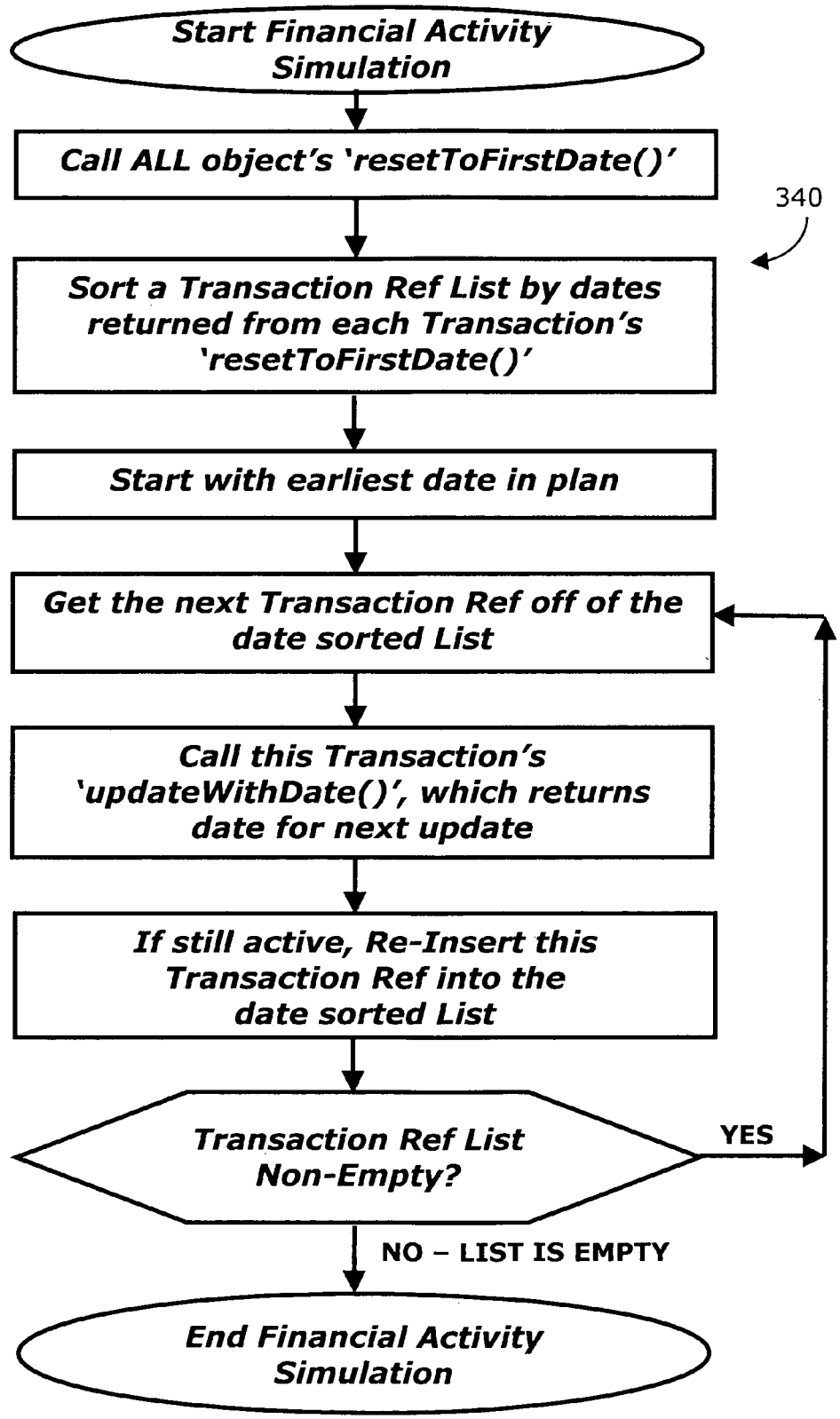
FIG. 34 depicts the operation of the financial activity simulator.

FIG. 34 depicts the control operation 340 of the financial activity simulator. In addition to the standard 'create( )' method, FIG. 33 lists the Transaction class' 'updateWithDate( )' method call, called by the financial activity simulator of FIG. 18 to allow each Transaction object to perform its work. Note that the Transaction class method 'ResetToFirstDate( )' (inherited/overridden from the Time/Value class) calls both the Time/Value and the Schedule object's 'ResetToFirstDate( )' method. The operation of the invention program's Financial Activity Simulator is summarized in the flowchart of FIG. 34. For each financial object the user created using the Planning Analysis Tool of FIG. 8, the invention program calls the Time/Value class's 'resetToFirstDate( )' method (see FIG. 29), which returns the first (earliest) date that the object will be manipulated by the Financial Activity Simulator. The invention program then assembles a list of pointer references to the Transaction objects, sorted by their first-activity dates. The Financial Activity Simulator then calls the 'updateWithDate( )' method call of the first (earliest date) Transaction object in the date-sorted list, then removes this pointer from the list. This first activity date is the 'current' date simulated by the Financial Activity Simulator, which always passes the 'current' simulated date as input data to each 'updateWithDate( )' method call.

The 'updateWithDate( )' method call is where each Transaction object performs its work of associating with other financial objects and simulating financial activity. This method call must also return the date that the Transaction object wishes to have its 'updateWithDate( )' method called at again by the Financial Activity Simulator. This returned date is used to place the Transaction object's pointer back into the date-stored pointer list. The Financial Activity Simulator again calls the 'updateWithDate( )' method call of the first (earliest date) Transaction object in the date-sorted list, repeating the process above. The 'current' date is updated with the next transaction object's date. If more than one Transaction object pointer occupies the same date, the Transactions with the highest 'Priority' data member (see FIG. 33) values will have their 'updateWithDate( )' calls made before the lower numbered 'Priority' values.

If the date returned from 'updateWithDate( )' is equal to, or earlier than, the Financial Activity Simulator's 'current' simulation date, the Transaction object's pointer is not placed back into the date-stored list. In this manner, a Transaction object can tell the Financial Activity Simulator that it is done with its processing. Hence the Financial Activity Simulator continues the FIG. 34 processing loop until either the date-sorted Transaction object pointer list is empty, or until the 'current' simulation date exceeds the last date the user wishes to simulate.

Figure 35:
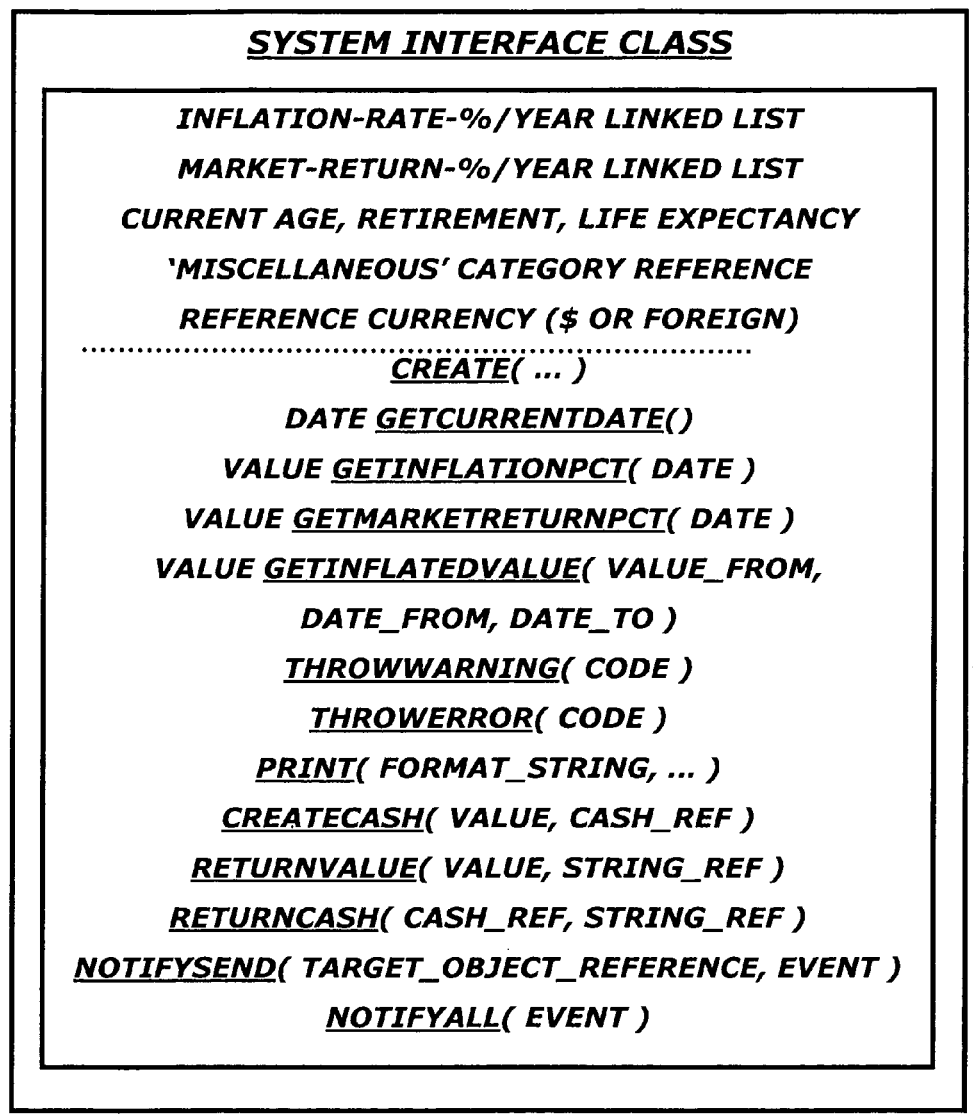
FIG. 35 depicts the data and method structure of the System Interface class.

FIG. 35 depicts the data and method structure 350 of the System Interface class. The System Interface class allows any primary financial object to extract user-defined information, or notify the user (or other objects) of events. To provide user-specified information, the System Interface class' data members include the configuration information entered by the user when the invention system first was started, as shown in FIG. 4. Note that the 'Inflation-Rate' and 'Market-Return' data members are linked lists, allowing consideration of non-constant rates over time (say to consider how higher inflation rates in retirement would affect planned spending). The 'Reference Currency' selects the default currency type to interpret 'cash' related values as.

Only one System Interface object is instantiated by the invention program, and this object is visible to any other object's method calls. For example, if an Account to Account Transfer Transaction object wishes to adjust the transferred amount by the user-specified inflation rate, it could call the System Interface object's 'getInflationPct( )' method call. A cash value at a particular date can be adjusted for inflation to another date via 'getInflatedValue( )'. The current date the program is simulating with the Financial Activity Simulator shown in FIG. 34, is returned via 'getCurrentDate( )'.

Objects can notify the system of warning or error conditions via the System Interface object's 'throwWarning( )' and 'throwError( )' methods, respectively. For example, an Account object may call the 'throwWarning( )' method when an balance goes below a threshold balance. These warnings and errors are then displayed to the user, as shown in FIG. 18. The 'print( )' System Interface method would allow any method call to output text-based information to the Planning Analysis Tool for diagnostic purposes. Note that output methods other than 'print( )' (such as graphical or user-interface methods) should be considered to be part of this invention.

The System Interface's 'createCash( )' method call adds simulated cash to the input 'cash' data type object (via its reference) without having to draw income from a Category object, or withdraw money from an Account object. Use of this call by any object after the current calendar date will cause warnings to be displayed to the user, as this represents un-tracked (and thus un-simulated) cash flow.

The method calls 'returnValue( )' and 'returnCash( )' of FIG. 35 allow, respectively, an object to return to the system a 'value' or a 'cash' data type. The invention system keeps a log of all values and cash returned from objects, which can be used as input data to other objects. For example, a Close Account Transaction object may close an Account object using the Account's 'close( )' method (FIG. 31), which returns a 'cash' amount. The Transaction object would then input the closed-account's 'cash' amount data into the System Interface's 'returnCash( )' call, thus making this 'cash' available as input to other objects (say, to open a new Account object using the 'cash' from the closed Account object).

An object can use the System Interface object's 'notifySend( )' method (FIG. 35) to send a notification event to another object, which the target object would received with its Time/Value object's 'notifyReceive( )' method. Similarly, the 'notifyAll( )' method can be used to broadcast a notification event to many target objects (using the Time/Value class' 'Notification Reference List' of FIG. 29.

Figure 36:
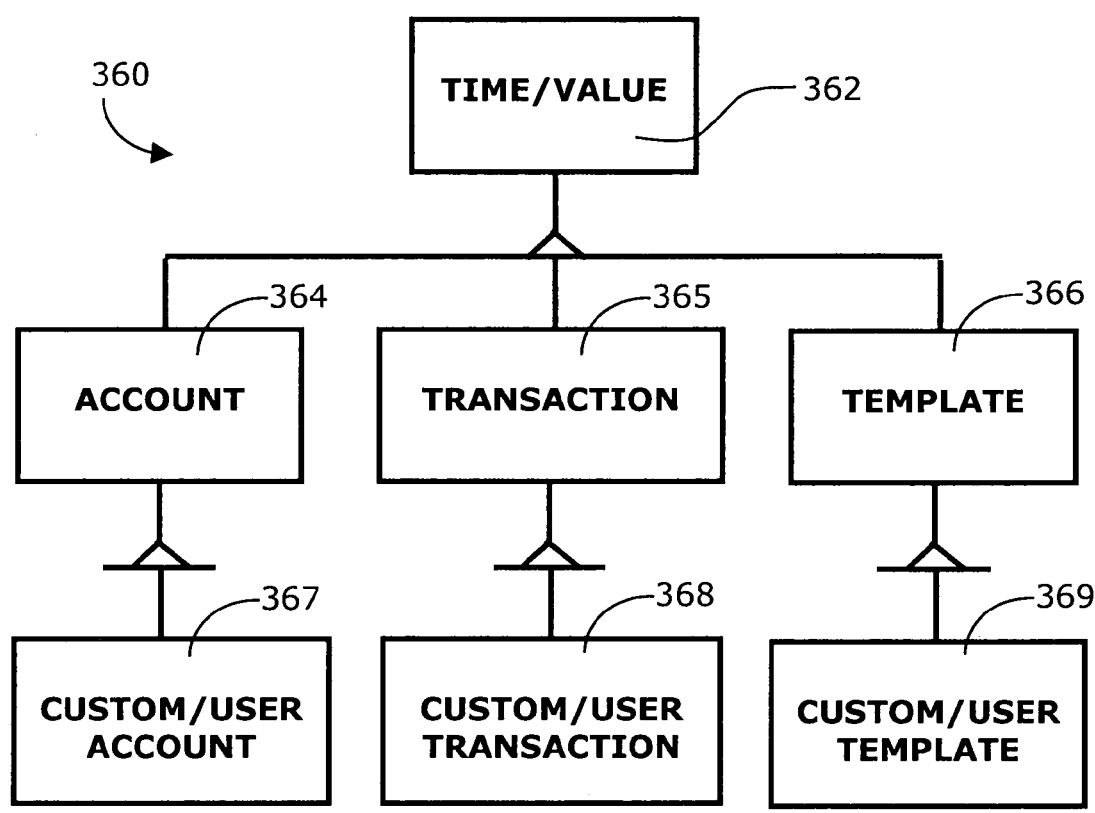
FIG. 36 depicts three primary classes that are typically inherited by custom classes.

FIG. 36 depicts three primary classes that are typically inherited by custom classes such as Custom/User Account 367, Custom/User Transaction 368 and Custom/User Template 369. As depicted in FIG. 36, three 'base' classes in the invention system are typically inherited by 'custom' classes: the Account 364, Transaction 365, and Template 366 classes. The invention's various tools are restricted to manipulating only objects instantiated from 'custom' classes. For example, at this level of inheritance, Mutual Fund and Checking Account classes are differentiated via separate custom classes inherited from the Account base class. Account-to-Account Transfer Transaction classes take on a different personality than Spending Activity Transaction classes. A custom class is expected to use the base class' method call names, but carries out its own custom actions once the method call is evoked.

In the preferred embodiment of the invention, enough custom class types would be built into the invention software to implement the planning needs of most users. However, provisions would be made for users to write their own custom classes that could be read into the invention software, and used as like any other object in the Planning Analysis Tool of FIG. 7. Such implementations may include reading text files that have pseudo C++ or Java language software 'custom' class definitions, or else may be Microsoft COM/Active-X or Sun JavaBeans components implementing the desired 'custom' class.

Figure 37:
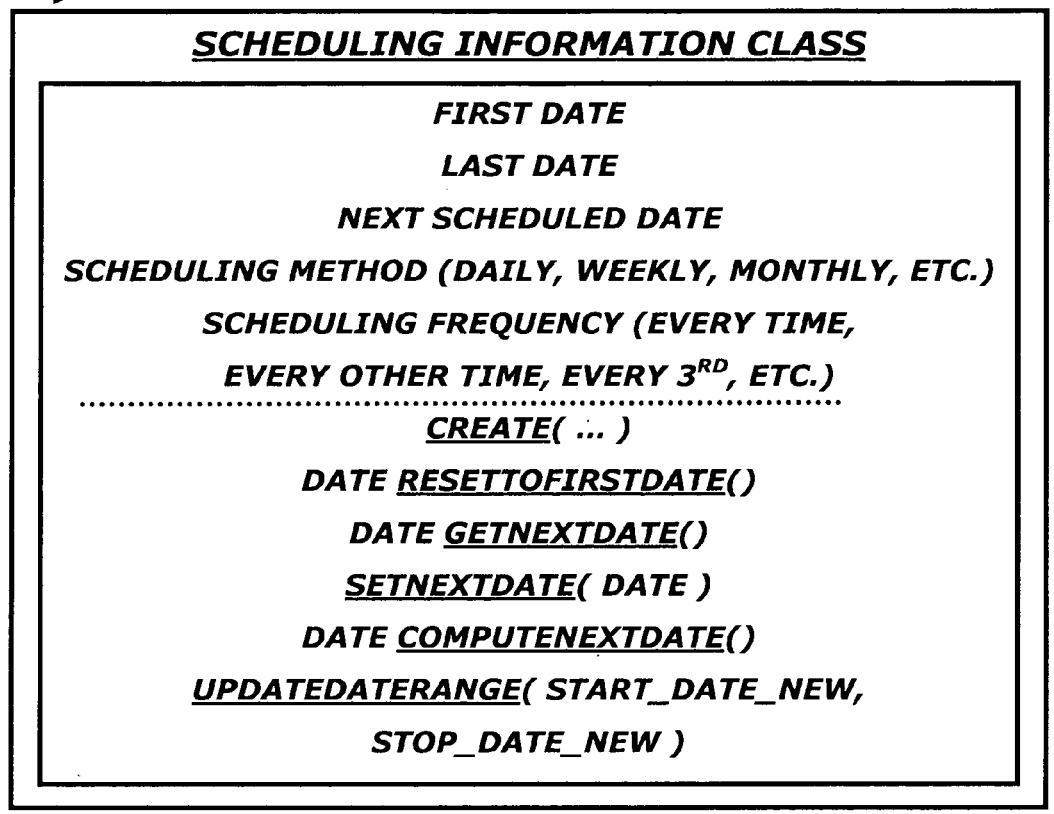
FIG. 37 depicts the data and method structure of the Scheduling Information class.

FIG. 37 depicts the data and method structure 370 of the Scheduling Information class. The Transaction class, detailed earlier in FIG. 33, can use this class to support repeated actions that occur on a regular basis, starting at the 'First Date' in the data member list of FIG. 37, and ending at the 'Last Date'. The 'Next Scheduled Date' notes the next date at which an action should happen, as computed from the 'Scheduling Method' and 'Scheduling Frequency' data members. After the ubiquitous 'create( )' call in FIG. 37 is the 'resetToFirstDate( )' method, which resets the 'Next Scheduled Date' to the 'First Date', returning the 'First Date'. As was detailed earlier, this method call is made for each Transaction object prior to running the Financial Activity Simulator of FIG. 34. The remaining methods are various primitives used to set, update, or compute scheduled dates.

Figure 38:
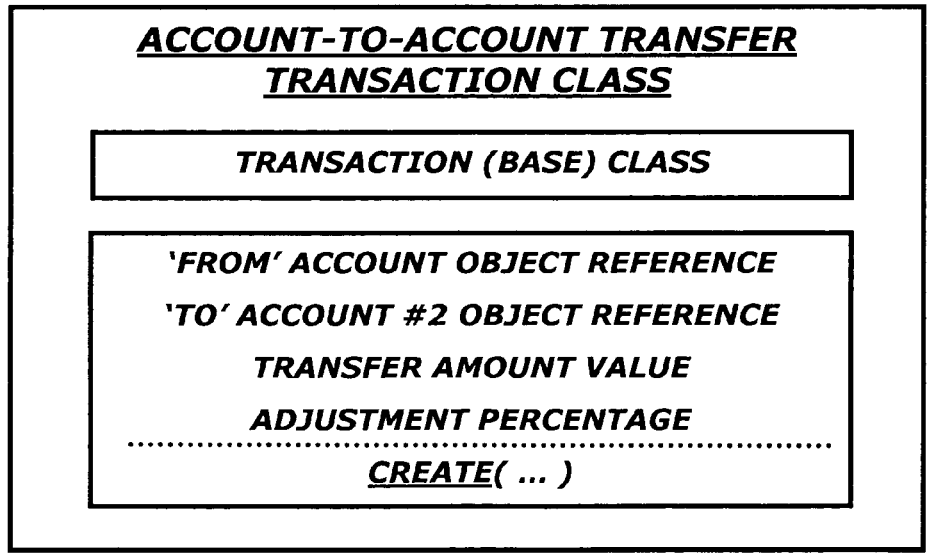
FIG. 38 depicts the data and method structure of an Account-to-Account Transfer Transaction class, a custom class inherited from the Transaction class.

FIG. 38 depicts the data and method structure 380 of an Account-to-Account Transfer Transaction class, a custom class inherited from the Transaction class. The remainder of this description provides a detailed example of a simple custom class (an Account to Account Transfer Transaction) and one possible implementation within the invention system, though it is understood other implementation of the inventions concepts would still be within the scope of the invention. FIG. 38 summarizes the custom class used in the example, showing that the Transaction class is to be inherited from, making this custom class a Transaction class as far as the Financial Activity Simulator of FIG. 34 is concerned. Hence the Financial Activity Simulator could call the 'updateWithDate( )' method call of any object instantiated from the Transaction class. The custom class example of the FIG. 38 adds references to two Account objects to be associated by the custom Transaction. An amount to transfer from one Account object to the other, as well as the percentage this amount needs to be adjusted to (say to simulate inflation) finishes out the data list for this custom class.

Figure 39:
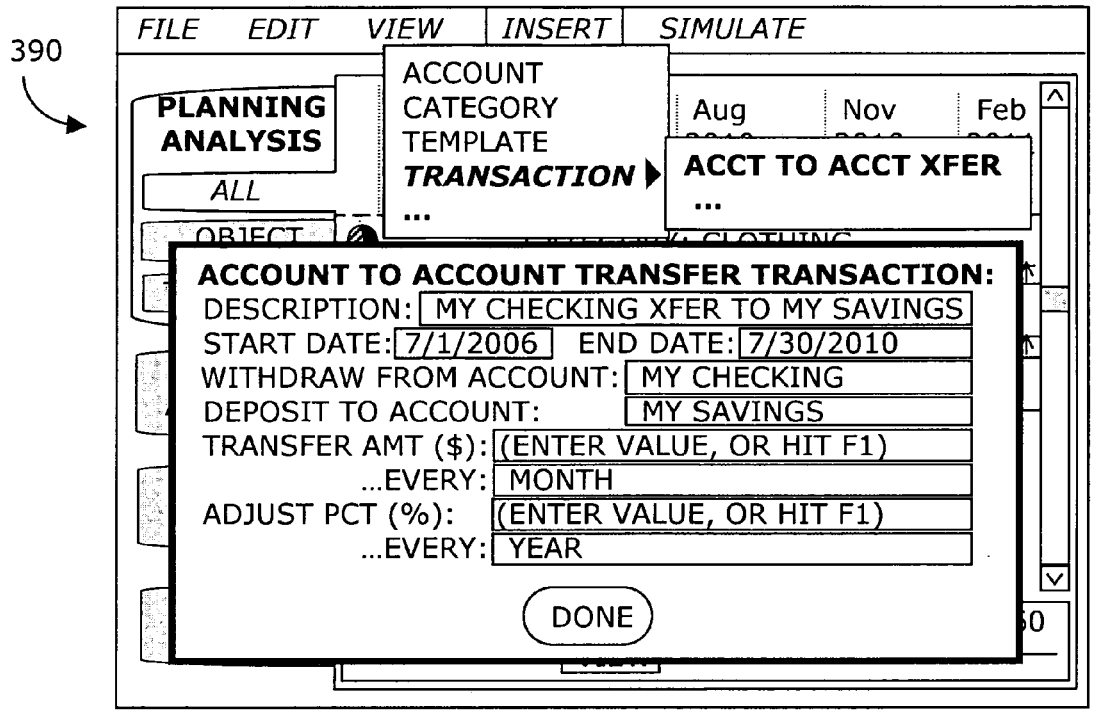
FIG. 39 depicts the PLANNING ANALYSIS screen with a user-created custom class depicted in FIG. 38.

FIG. 39 depicts the PLANNING ANALYSIS screen 390 with the user-created custom Transaction class depicted in FIG. 38. FIG. 39 shows how the Planning Analysis Tool screen might look when the user creates the custom class. Each input field in the property-sheet GUI is used as input data to the custom class' 'create( )' method. In FIG. 39, the user has filled out all the required input information, except for the transfer amount and adjustment percentage. While the user may enter absolute values for the transfer and adjustment values, the invention also adds enhanced input options, which can be selected from a separate input-options window (for example, when the user presses the right mouse button) as shown in FIG. 40.

Figure 40:
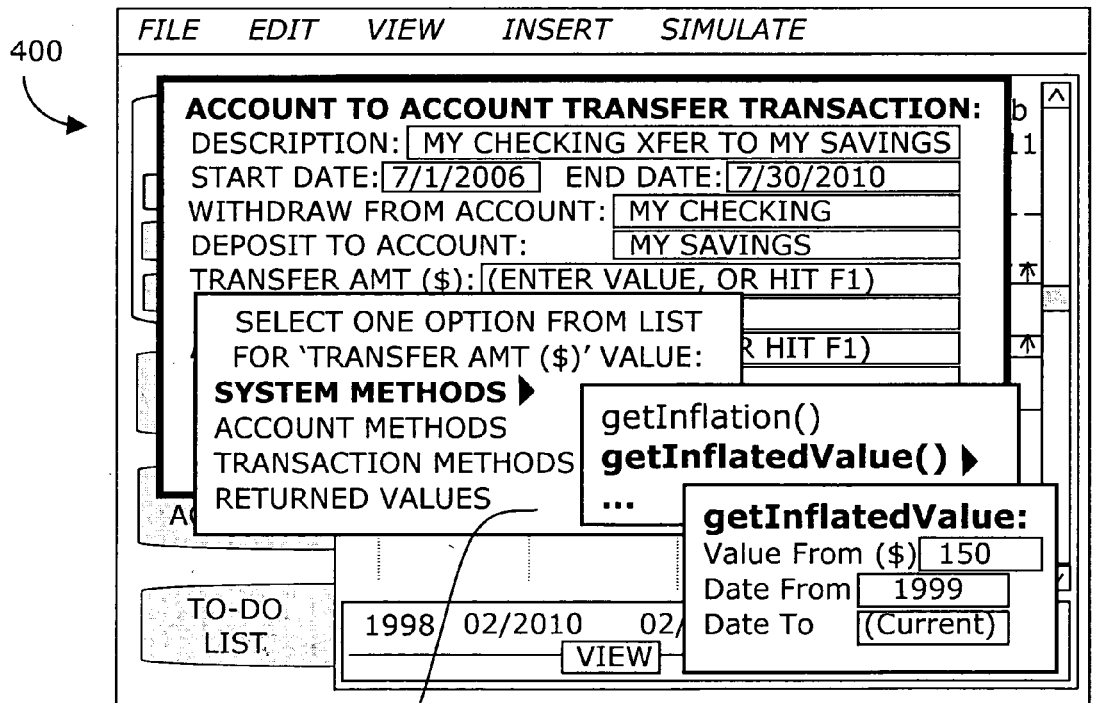
FIG. 40 depicts an input options window for the Transfer Amount input field shown in FIG. 39.

FIG. 40 depicts a screen 400 showing an input options window 402 for the Transfer Amount input field shown in FIG. 39. The 'methods' lines in the options window allow select methods to be called on any instantiated financial object currently created in the invention program, including the System-Interface object. The input-options window only lists method calls that return the same data type as required for the input field (in this example, the 'value' type is required). The 'Returned Values' line of the options window lists all values that have been returned to the invention via the System-Interface object's 'returnValue( )' method call previously mentioned in reference to FIG. 35.

Figure 41:
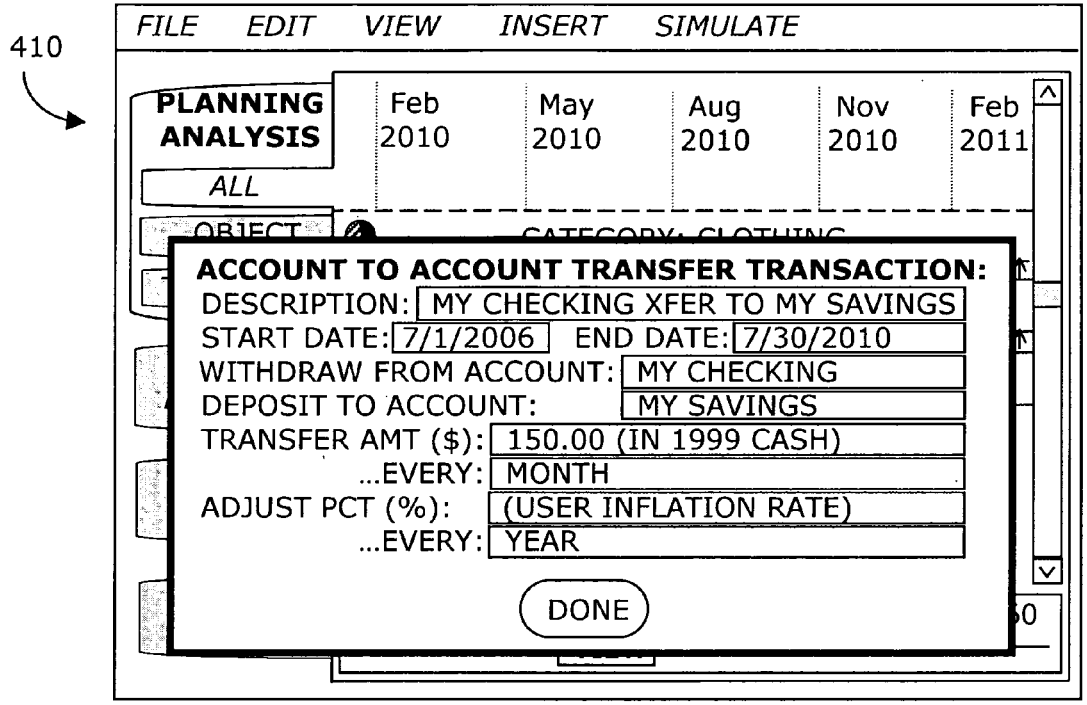
FIG. 41 depicts the result of calls to the System Interface object from the screen shown in FIG. 39.

FIG. 41 depicts a screen 410 showing the results of calls to the System Interface object from the screen shown in FIG. 40. FIG. 41 shows the result of the user selecting the System Interface object's 'getInflatedValue( )', with '150' as the 'Transfer Amount' in 1999 year dollars. The figure also shows the result of selecting 'getInflationpct( )' for the 'Adjust Pct' field. Both of these System Interface object method calls accept a 'date' data value as input. By default, this date is the 'current' date that the financial object is being created at (in the FIG. 41 example, '7/1/2006' is the 'current' date). The 'Starting date' input field is always set to the 'current' date. If the user changes the date, the 'current' date also will change in the invention for all fields in the Property Sheet that use 'current' date (in this example, the 'getInflatedValue( )' and 'getInflationPct( )' System Interface method calls).

Figure 42:
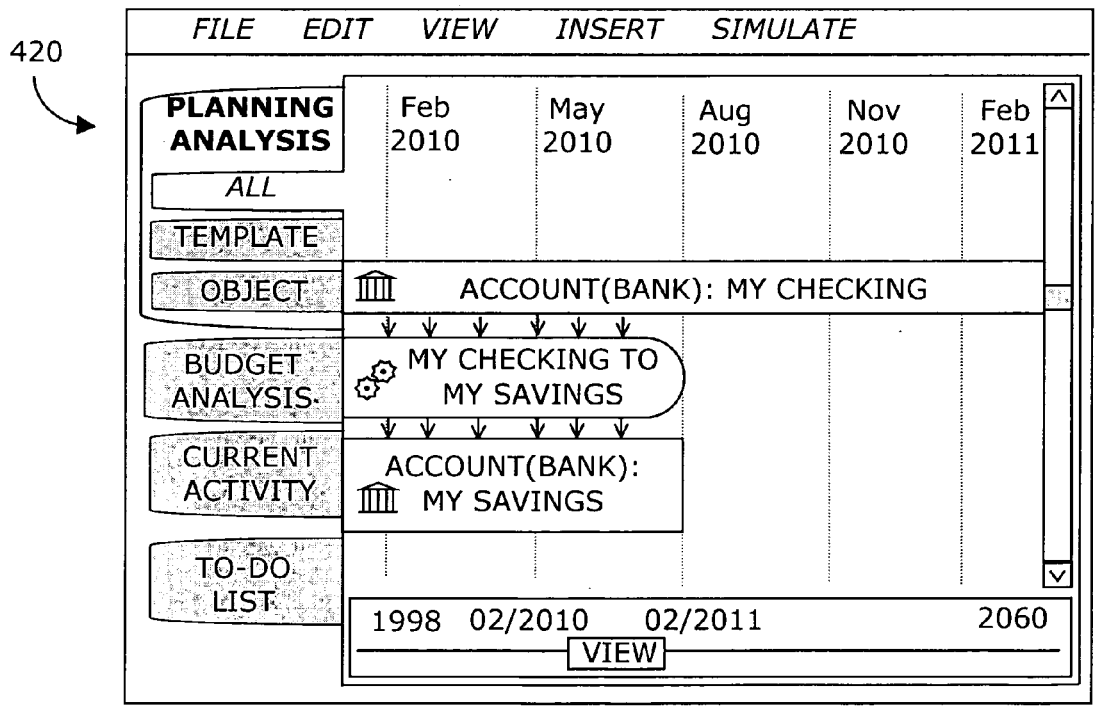
FIG. 42 depicts the newly created Account-to-Account Transfer Transaction object from FIG. 41.

FIG. 42 depicts a screen 420 showing the newly created Account-to-Account Transfer Transaction object from FIG. 41. If the user drags this object left or right, its Time/Value class' 'updateDateRange( )' is called by the invention program to inform the object that it needs to adjust its date information. If the user copies an object, then adjusts the viewed date range into the fixture by dragging the 'View' box at the bottom of the screen to the right, then pastes the object into the view, the Property Sheet of FIG. 41 again reappears on the screen. However, the 'current' date (and all other fields that rely on the 'current' date) is altered to the date the mouse cursor was at in the new future date view. Most likely, the automatically updated fields in this new object would be ready to use by the user as is.

FIG. 43 depicts a possible partial implementation 430 in C++ programming language of the Transaction object class shown in FIG. 33. However, it is understood that any specific implementation of the invention concepts is within the scope of the invention. The language syntax 'class CTrans: public CTimeValue' indicates that the Transaction class 'CTrans' inherits its data and methods from the Time/Value class 'CTimeValue'. The 'public:' section lists method calls that can be made on an instantiated Transaction object from outside the class. Here, the 'CTrans( )' method is equivalent to the 'create( )' call of FIG. 33. The '~CTrans( )' method is the class destructor, freeing any computer memory resources consumed by an instantiated object when it is deleted.

The 'updateWithDate( )' method is shown, with its 'date_curr' current-simulation-date input data, and 'next date' return data. Note that date data is handled with the 'CDate' class, which manages year, month, day, and possibly time information. The 'virtual' keyword before the method call indicates that the method can be overridden by an inheriting class. Here, 'updateWithDate( )' must be overridden by a specific Transaction 'custom' class (say, the Account-to-Account Transfer Transaction custom class). The '=0' suffix in C++ enforces this mandatory inheritance. The 'resetToFirstDate( )' and 'updateDateRange( )' method calls are inherited from the Time/Value base class.

The 'protected' section of FIG. 43 lists the data members associated with the Transaction class, with the two scheduling classes and 'Priority' of FIG. 33. Since these data values are not in the 'public' section of the class, they cannot be modified outside of the class' method calls directly, thus protecting the data.

FIG. 44 depicts a possible partial implementation 440 in C++ programming language for the Account-to-Account Transfer Transaction custom class shown in FIG. 38. FIG. 44 shows partial C++ code for an Account-to-Account Transfer Transaction 'custom' class 'CTrans_acctToAcct'. The 'public CTrans' syntax indicates that this class inherits from the Transaction class of FIG. 43. The first two methods in the 'public' section, 'CTrans_acctToAcct( )' and '~CTrans_acctToAcct( )', are the standard class creation and destructor calls, respectively. The remaining methods are identical to the 'CTrans' class in FIG. 43.

The 'protected' section of this FIG. 44 custom class declares the data members unique to the custom class (as opposed to the 'CTrans' class' data members that are inherited by every custom Transaction class). Here, two Account object 'pointer' references are shown, one for the Account to get cash 'from', and the other to send cash 'to'. In operation, the two Account objects referred to here must be created separately prior to instantiating objects from this Transaction custom class. The data member 'm_moneyToXfer' is the amount of cash to transfer between the two accounts, and 'm_adjustPct' is the percentage to increase the transfer amount at each adjustment schedule.

FIG. 45 depicts the data and method structure 450 of the Cash data type class and details the 'cash' data type class mentioned previously. Transaction object method calls use 'cash' objects whenever simulated cash needs to be transferred in and out of Account or Category objects. The 'cash' class has two data members, representing the amount of simulated cash to be transferred, and the currency type the amount is in. Note that the 'create( )' method call takes no input data, and initializes the simulated cash amount data to zero. The method call 'addToCash( )' adds the input 'value' data to a 'cash' object's 'amount', increasing its simulated cash value. The method call 'getFromCash( )' returns 'value' data equal to a 'cash' object's 'amount', then sets this 'amount' to zero. Only Account and Category objects may execute these two methods. Hence Transaction objects are restricted from sourcing or draining simulated cash, thereby reducing the amount of unaccounted and untracked (and thus inaccurate) cash flow generated with the Financial Activity Simulator. The method call 'currentAmount( )' may be called by any object (including Transaction objects) wishing to know the amount of simulated cash currency stored in a 'cash' object.

The class content diagrams of the FIG. 23 form used in this invention proposal have listed a 'create( )' method call, used to initialize each instantiated object. Not shown in these figures, but implemented by every C++ class, is the class 'destructor' method call, generally used to free up any computer resources allocated during creation. For the 'cash' class, the destructor method is used to notify the invention user of unaccounted cash flow by calling the System Interface class' 'throwWarning( )' method call (FIG. 35) if the simulated cash amount is non-zero. The non-zero simulated cash will then be sent to the System Interface object's 'Miscellaneous' Category object shown in FIG. 35.

FIG. 46 provides a possible implementation 460 in C++ programming language of the FIG. 44 Account-to-Account Transfer Transaction custom class' 'updateWithDate( )' method. Recall from the FIG. 34 Financial Activity Simulator flowchart that 'updateWithDate( )' is called for each Transaction object with the next date to simulate, requiring 'date_curr' as input data, with a 'next' date returned. The first line of FIG. 44 implements this action. In the next line, a Date object 'date_test' is instantiated for use only by this 'updateWithDate( )' method, and set equal to the 'current' simulation date returned by the System Interface object's method call 'getCurrentDate( )'. 'SYSINTF' is the name of the System Interface object for this example. The next line compares 'date_test' to 'date_curr' (the simulation date passed in as input to the 'updateWithDate( )' method call). Since these two dates should be equivalent, the System Interface's 'print( )' method would then be executed to display the 'Just a test . . . ' text in the Planning Analysis Tool.

The first line of software typically executed by the 'updateWithDate( )' method is a comparison of the input 'date_curr' with the date returned from the 'Update' Scheduler object's 'getNextDate( )' method call (see FIG. 37). If these dates are not the same, then an error condition is encountered, which the invention system is notified of via the 'SYSINTF.throwError( )' method call. The 'return(date_curr)' statement exits the method call, and returns the same date as was passed in, which will 'de-activate' this Transaction object from being executed any more by the Financial Activity Simulator (see FIG. 34).

If 'date_curr' is as expected by the 'Update' Scheduler object, then it is compared to the next date expected by the 'Adjust' Scheduler object via the 'date_curr>m_schAdjust.getNextDate( )' statement. If an adjustment is required, the transfer amount 'm_moneyToXfer' is increased by the adjustment percentage 'm_adjustPct', and the 'Adjust' Scheduler object has its next adjustment date computed via 'm_schAdjust.computeNextDate( )'. The line 'CCash cash_xfer' creates a 'cash' data type object (with a simulated value of 0 as previously discussed). The line 'm_acctFrom->withdraw(m_moneyToXfer, cash_xfer)' executes the 'From' Account object's 'withdraw( )' method to add the amount of 'm_moneyToXfer' in simulated cash into the 'cash' data type variable 'cash_xfer'. The line 'm_acctTo->deposit(cash_xfer)' deposits the cash into the 'to' Account object via its 'deposit( )' method call, and empties the simulated cash amount in 'cash_xfer'.

The line 'addNew(date_curr, m_moneyToXfer)' adds the current simulation date and transferred cash value to this Transaction object's Time/Value date/value linked list (FIG. 29). Note that this step is optional, allowing the user to examine the transferred amount for this Transaction over time after each Financial Activity Simulation is executed, in the Planning Analysis Tool of FIG. 18. The last line of the 'updateWithDate( )' method ('return(m_schUpdate.computeNextDate( ))') returns the date returned from the 'Update' Scheduler object's 'computeNextDate( )' method call, which computes the next scheduled date for the Transaction object, then returns that 'next' date. As FIG. 34 shows, the Financial Activity Simulator uses this returned 'next' date to re-schedule when this Transaction object will once again have its 'updateWithDate( )' method called.

Upon exiting the 'updateWithDate( )' method call of FIG. 46, all objects that were created during the call will be destroyed. Hence the 'cash' object 'cash_xfer' will have its destructor called, which, as detailed previously, would throw a warning to the user in the Planning Analysis Tool shown in FIG. 18, if the simulated cash amount was not zero (indicating that cash was not properly transferred by the Transaction object).

Although the present invention has been described in detail with reference to certain preferred embodiments, it should be apparent that modifications and adaptations to those embodiments may occur to persons skilled in the art without departing from the spirit and scope of the present invention as set forth in the following claims.

What is claimed is:

1. A personal financial management software program embedded on computer-readable media for recording, predicting, and comparing financial data, comprising:

a graphical user interface for creating, manipulating and displaying system tools, the system tools including a current activity tool, a planning analysis tool and a budgeting analysis tool;

the current activity tool enabling users to enter current updates to financial transaction data objects and display a to-do list of activities prompting users to implement projected financial activity in the planning analysis tool;

the planning analysis tool enabling users to graphically plan and model financial activity by entering projected financial planning transaction objects and simulating financial activity from an earliest past date to a latest future data and including a financial activity simulator to identify, depict and eliminate discrepancies and shortfalls in the modeled transaction objects;

the budgeting analysis tool enabling users to compare current financial activity with simulated financial activity from the financial activity simulator showing actual and simulated cash flows, and enabling users to minimize differences between the actual and simulated cash flows; and template objects comprising groups of related account, category and transaction objects representing multiple cash flows over a user-specified period of time, the template objects being created, manipulated, and displayed by users for simplified financial planning, budgeting and forecasting using the current activity tool, the planning analysis tool, and the budgeting analysis tool.

2. A personal financial management software program according to claim 1, wherein each object is derived from an object class selected from the group consisting of an account class, a transaction class, a category class, and a template class.

3. A personal financial management software program according to claim 2, wherein the account class comprises objects selected from the group consisting of bank account objects, credit account objects, investment account objects, loan account objects, and mortgage account objects.

4. A personal financial management software program according to claim 2, wherein the transaction class comprises objects selected from the group consisting of account/account transaction objects, account/category transaction objects, account/transaction transaction objects, category/transaction transaction objects, and close account transaction objects.

5. A personal financial management software program according to claim 2, wherein the category class comprises an expense category class and an income category class.

6. A personal financial management software program according to claim 5, wherein the expense category class comprises objects selected from the group consisting of subsistence expense objects, health expense objects, recreation expense objects, transportation expense objects, tax objects, and luxury expense objects.

7. A personal financial management software program according to claim 5, wherein the income category class comprises objects selected from the group consisting of investment income objects, retirement income objects, and labor income objects.

8. A personal financial management software program according to claim 2, wherein the template class comprises objects selected from the group consisting of scheduled spending template objects, scheduled income template objects, and loan payment template objects.

9. A personal financial management software program according to claim 1, further comprising system interface objects to accept user preference defaults for use by the program tools.

10. A personal financial management software program according to claim 1, further comprising cash objects used by transaction objects for tracking cash flows.

11. A personal financial management software program according to claim 1, further comprising a to-do list displayed in the current activity tool for enabling the planning analysis tool to prompt the user to implement projected financial activity.

12. A personal financial management software program according to claim 2, further comprising account data from other financial programs imported into account objects.

13. A personal financial management software program according to claim 2, further comprising category data from other financial programs imported into category objects.

14. A personal financial management software program according to claim 1, further comprising a programming means for enabling the user to create and incorporate a custom object wherein each custom object is derived from an object class selected from the group consisting of an account class, a transaction class, a category class, and a template class.

15. A personal financial management software program according to claim 1, wherein the planning analysis tool comprises a financial activity simulation of all objects created by the user, the simulation modeling all financial activity from the earliest past date to the latest future date entered.

16. A personal financial management software program according to claim 15, wherein the financial activity simulation identifies and graphically depicts discrepancies and shortfalls in the modeled transactions.

17. A personal financial management software program according to claim 15, wherein the financial activity simulation is adjusted to eliminate discrepancies and shortfalls, and to provide a more accurate fit with actual financial activity.

18. A method for recording, predicting, and comparing financial data using a personal financial management software program embedded on computer-readable media, comprising:

creating, manipulating, and displaying system tools by a graphical user interface, the system tools including a current activity tool, a planning analysis tool, and a budgeting analysis tool;

enabling users of the current activity tool to enter current updates to financial transaction data objects and display a to-do list of activities prompting users to implement projected financial activity in the planning analysis tool;

enabling users of the planning analysis tool to graphically plan and model financial activity by entering projected financial planning transaction objects and simulating financial activity from an earliest past date to a latest future data and including a financial activity simulator to identify, depict and eliminate discrepancies and shortfalls in the modeled transaction objects;

enabling users of the budgeting analysis tool to compare current financial activity with simulated financial activity from the financial activity simulator showing actual and simulated cash flows, and enabling users to minimize differences between the actual and simulated cash flows; and grouping related account, category and transaction objects representing multiple cash flows over a user-specified period of time into template objects, the template objects being created, manipulated, and displayed by users for simplified financial planning, budgeting and forecasting using the current activity tool, the planning analysis tool, and the budgeting analysis tool.

19. A method according to claim 18, wherein the objects belong to object classes comprising an account class, a transaction class, a category class, and a template class derived from a time/value class.

20. A method according to claim 19, wherein the category class comprises an expense category class and an income category class.

21. A method according to claim 18, further comprising accepting user preference defaults by system interface objects for use by the program tools.

22. A method according to claim 18, further comprising tracking cash flows by cash objects used by transaction objects.

23. A method according to claim 18, further comprising enabling the planning analysis tool to prompt the user to implement projected financial activity by a to-do list displayed in the current activity tool.

24. A method according to claim 19, further comprising importing account data from other financial programs into account objects.

25. A method according to claim 19, further comprising importing category data from other financial programs into category objects.

26. A method according to claim 18, further comprising enabling the user to create and incorporate custom objects into the personal financial management software program.

27. A method according to claim 18, wherein simulating financial activity comprises simulating financial activity of all objects created by the user from the earliest entered date to the latest future date entered.

28. A method according to claim 27, wherein simulating financial activity further comprises identifying and graphically depicting discrepancies and shortfalls in the simulated transactions.

29. A method according to claim 27, wherein simulating financial activity further comprises adjusting objects to eliminate discrepancies and shortfalls, and providing a more accurate fit with actual financial activity.

30. A computer software program on a computer-readable medium incorporating the method recited in claim 18.

31. A computer-implemented method for personal financial management, comprising the steps of:
   creating, manipulating, and displaying system tools by a graphical user interface, the system tools including a current activity tool, a planning analysis tool, and a budgeting analysis tool;
   using the system tools, entering data from past, current, and projected financial transactions into objects belonging to an account class, a category class, and a transaction class;
   using system tools, defining objects belonging to a template class that associate common activities of financial transactions comprising objects of an account class, a category class, and a transaction class;
   using the planning analysis tool, graphically planning and modeling financial activity by entering projected financial planning transaction objects and simulating financial activity from an earliest past date to a latest future data and including a financial activity simulator to identify, depict and eliminate discrepancies and shortfalls in the modeled transaction objects;
   tracking cash flows due to transactions entered by a user by use of cash objects;
   using the budgeting analysis tool, comparing current financial activity with simulated financial activity from the financial activity simulator showing actual and simulated cash flows, and enabling users to minimize differences between the actual and simulated cash flows;
   displaying a to-do list of activities in the planning analysis tool for prompting the user to initiate planned actions; and
   grouping related account, category and transaction objects into representing multiple cash flows over a user-specified period of time template objects, the template objects being created, manipulated, and displayed for simplified financial planning, budgeting and forecasting using the current activity tool, the planning analysis tool, and the budgeting analysis tool.

32. A computer software program contained on a computer-readable medium incorporating the method recited in claim 31.

33. A computer programmed to perform the steps in the computer-implemented method as recited in claim 31.

34. A personal financial management software system embedded on computer-readable media for recording, predicting, and comparing financial data, comprising:
   a graphical user interface for creating, manipulating and displaying system tools, the system tools including a current activity tool, a planning analysis tool, and a budgeting analysis tool;
   the current activity tool enabling users to enter current updates to financial transaction data objects and displaying a to-do list of activities prompting users to implement projected financial activity in the planning analysis tool;
   the planning analysis tool enabling users to graphically plan and model financial activity by entering projected financial planning transaction objects and simulating financial activity from an earliest past date to a latest future data and including a financial activity simulator to identify, depict and eliminate discrepancies and shortfalls in the modeled transaction objects;
   the budgeting analysis tool enabling users to compare current financial activity with simulated financial activity from the financial activity simulator showing actual and simulated cash flows, and enabling users to minimize differences between the actual and simulated cash flows; and
   template objects comprising groups of related account, category and transaction objects representing multiple cash flows over a user-specified period of time, the template objects being created, manipulated, and displayed by users for simplified financial planning, budgeting and forecasting using the current activity tool, the planning analysis tool, and the budgeting analysis tool.

35. A personal financial management software system according to claim 34, wherein the objects belong to object classes comprising an account class, a transaction class, a category class, and a template class derived from a time/value class.

36. A personal financial management software system according to claim 34, further comprising system interface objects to accept user preference defaults for use by the program tools.

37. A personal financial management software system according to claim 34, further comprising cash objects used by transaction objects for tracking cash flows.

38. A personal financial management software system according to claim 34, further comprising a to-do list displayed in the current activity tool for enabling the planning analysis tool to prompt the user to implement projected financial activity.

39. A personal financial management software system according to claim 35, further comprising account data from other financial programs imported into account objects.

40. A personal financial management software system according to claim 35, further comprising category data from other financial programs imported into category objects.

41. A personal financial management software system according to claim 34, further comprising a programming means for enabling the user to create and incorporate custom objects into the personal financial management software program.

42. A personal financial management software system according to claim 34, wherein the planning analysis tool comprises a financial activity simulation of all objects created by the user, the simulation modeling all financial activity from the earliest past date to the latest future date entered.

* * * * *